United States Patent
Salomon et al.

(10) Patent No.: US 8,494,892 B2
(45) Date of Patent: Jul. 23, 2013

(54) TRACKING SUBSTANCES OVER VARIOUS BUSINESS PROCESSES

(75) Inventors: Thomas Salomon, Rauenberg (DE); Ralf Coenning, Friedrichshafen (DE)

(73) Assignee: SAP AG, Walldorf (DE)

(\*) Notice: Subject to any disclaimer, the term of this patent is extended or adjusted under 35 U.S.C. 154(b) by 1601 days.

(21) Appl. No.: 11/521,953

(22) Filed: Sep. 15, 2006

(65) Prior Publication Data

US 2007/0255626 A1 Nov. 1, 2007

Related U.S. Application Data

(60) Provisional application No. 60/795,414, filed on Apr. 27, 2006.

(51) Int. Cl.
*G06Q 10/00* (2012.01)
*G06F 7/00* (2006.01)

(52) U.S. Cl.
USPC .......... 705/7.23; 705/7.12; 705/28; 700/213

(58) Field of Classification Search
None
See application file for complete search history.

(56) References Cited

U.S. PATENT DOCUMENTS

| | | | |
|---|---|---|---|
| 4,737,910 A | | 4/1988 | Kimbrow |
| 5,168,445 A | | 12/1992 | Kawashima et al. |
| 5,532,928 A | * | 7/1996 | Stanczyk et al. ............. 705/7.26 |
| 5,726,884 A | * | 3/1998 | Sturgeon et al. ............. 705/7.12 |
| H1743 H | * | 8/1998 | Graves et al. ................. 700/236 |
| 5,870,733 A | * | 2/1999 | Bass et al. ............................ 1/1 |
| 6,097,995 A | * | 8/2000 | Tipton et al. .................. 700/266 |
| 6,209,004 B1 | * | 3/2001 | Taylor ............................. 715/236 |
| 6,237,051 B1 | * | 5/2001 | Collins ............................. 710/36 |
| 6,249,794 B1 | * | 6/2001 | Raman ........................... 715/210 |
| 6,256,640 B1 | * | 7/2001 | Smalley et al. ................. 705/1.1 |
| 6,311,134 B1 | | 10/2001 | Sorenson |
| 6,341,287 B1 | | 1/2002 | Sziklai et al. |
| 6,745,127 B2 | * | 6/2004 | Crosby ............................ 702/2 |
| 6,778,877 B2 | * | 8/2004 | Ichikawa et al. .............. 700/213 |
| 7,092,960 B2 | * | 8/2006 | Ohishi et al. ........................... 1/1 |
| 7,099,724 B2 | | 8/2006 | Satake et al. |
| 7,158,846 B2 | | 1/2007 | Fukatsu et al. |
| 7,171,426 B2 | | 1/2007 | Farmer et al. |
| 7,356,482 B2 | | 4/2008 | Frankland et al. |
| 7,636,675 B1 | | 12/2009 | Cheng et al. |
| 2002/0056638 A1 | * | 5/2002 | Ohishi et al. .................. 204/401 |
| 2002/0107761 A1 | | 8/2002 | Kark et al. |
| 2002/0184068 A1 | * | 12/2002 | Krishnan et al. .................. 705/8 |
| 2002/0188499 A1 | | 12/2002 | Jenkins et al. |

(Continued)

OTHER PUBLICATIONS http://ec.europa.eu/enterprise/reach/overview_en.htm.

(Continued)

*Primary Examiner* — Asfand Sheikh
(74) *Attorney, Agent, or Firm* — Fish & Richardson P.C.

(57) ABSTRACT

The disclosure provides a method, software, and system for monitoring substances. In one embodiment, a method includes identifying a first document associated with a business process of an enterprise. A first volume of a substance based, at least in part, on the business document is determined. A second document associated with the business process of the enterprise is identified. A second volume of the substance based, at least in part, on the business document is determined. The first volume and the second volume is aggregated. A file associated with the business process is updated with at least the aggregated volume.

18 Claims, 17 Drawing Sheets

U.S. PATENT DOCUMENTS

| | | | |
|---|---|---|---|
| 2002/0188588 A1* | 12/2002 | Patel-Framroze | 707/1 |
| 2003/0004965 A1* | 1/2003 | Farmer et al. | 707/104.1 |
| 2003/0120565 A1* | 6/2003 | Church et al. | 705/28 |
| 2004/0162936 A1 | 8/2004 | Hisasue et al. | |
| 2004/0215519 A1* | 10/2004 | Shick et al. | 705/15 |
| 2005/0086133 A1 | 4/2005 | Scherer et al. | |
| 2007/0043635 A1* | 2/2007 | Hotta et al. | 705/28 |
| 2007/0090179 A1* | 4/2007 | Konishi et al. | 235/375 |
| 2007/0178167 A1 | 8/2007 | Andrijauskas | |
| 2007/0255626 A1 | 11/2007 | Salomon et al. | |
| 2008/0040390 A1 | 2/2008 | Oves et al. | |

OTHER PUBLICATIONS

Tesoro; "Material Safety Data Sheet for Petroleum Hydrocarbon"; Oct. 22, 2003; retrieved from http://www.carsonoil.com/pdfs/MSDSJetFuel.pdf; 6 pages.

Office Action issued in U.S. Appl. No. 11/522,206 on Jun. 24, 2010; 13 pages.

Office Action issued in U.S. Appl. No. 11/522,205 on Apr. 28, 2010; 14 pages.

Office Action issued in U.S. Appl. No. 11/522,206 on Dec. 27, 2010; 20 pages.

Office Action issued in U.S. Appl. No. 11/522,205 on Oct. 15, 2010; 15 pages.

Advisory Action issued in U.S. Appl. No. 11/522,205 on Dec. 14, 2010; 3 pages.

Office Action issued in U.S. Appl. No. 11/522,206 on Oct. 12, 2011; 20 pages.

Office Action issued in U.S. Appl. No. 11/522,206 on May 23, 2012; 18 pages.

* cited by examiner

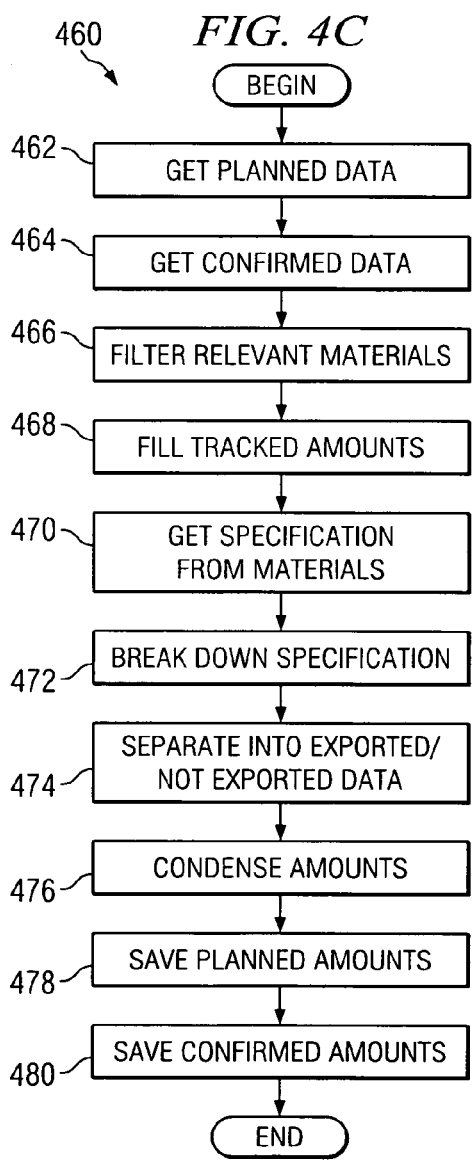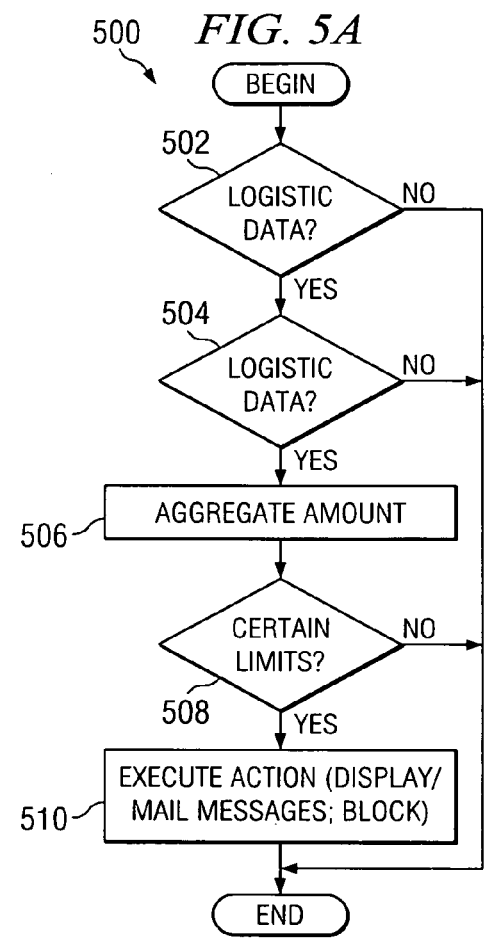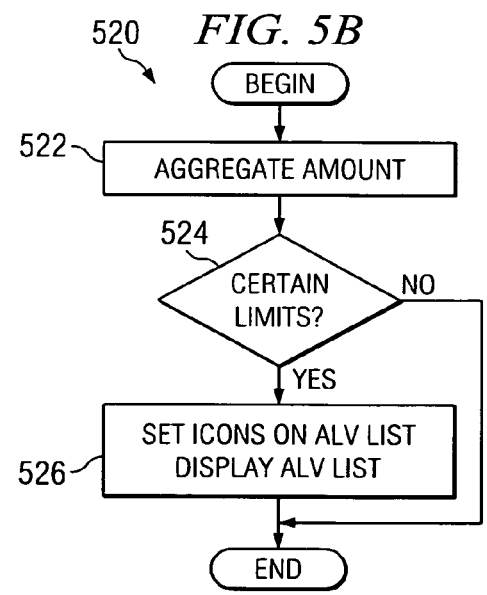

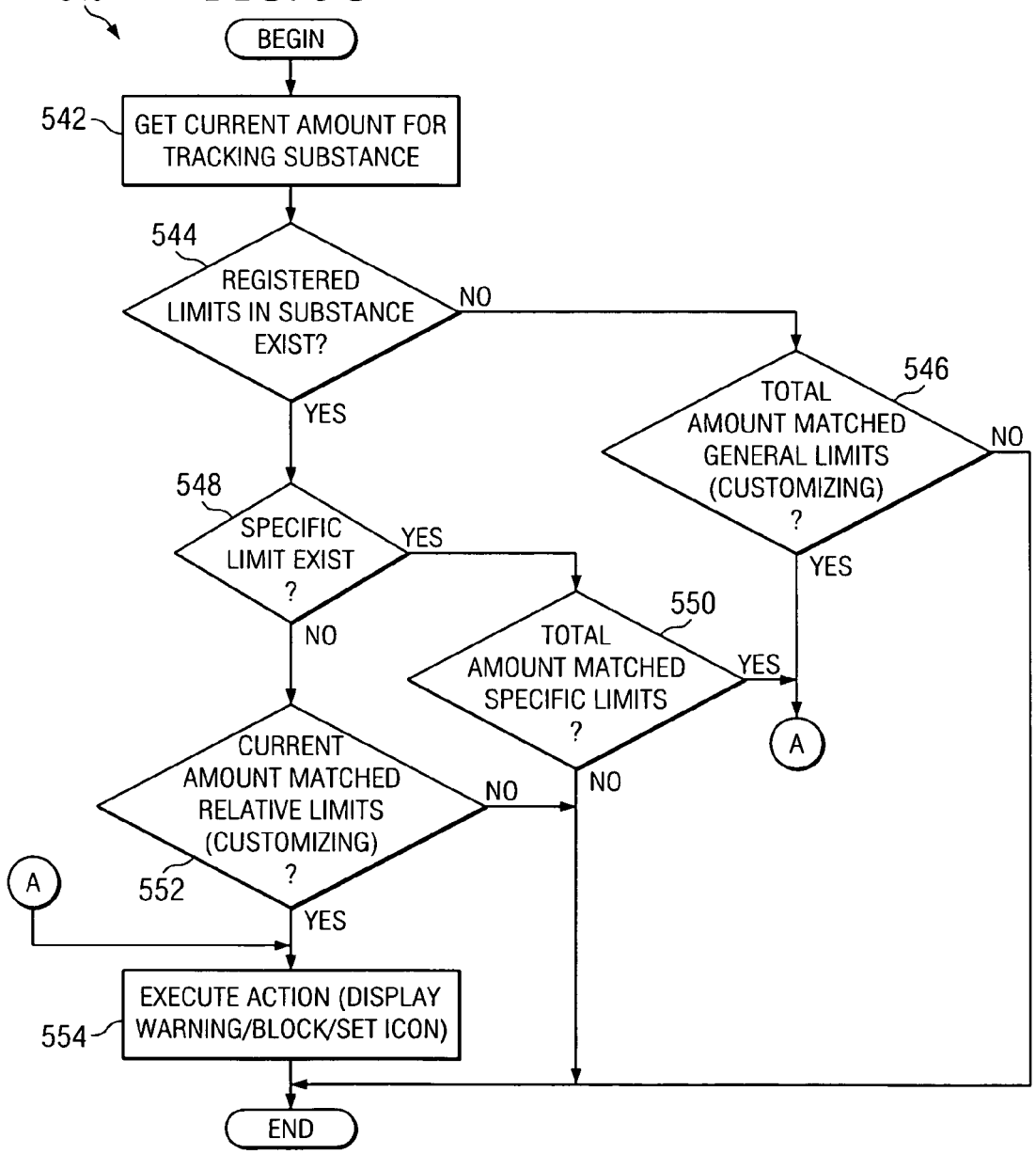

FIG. 7D

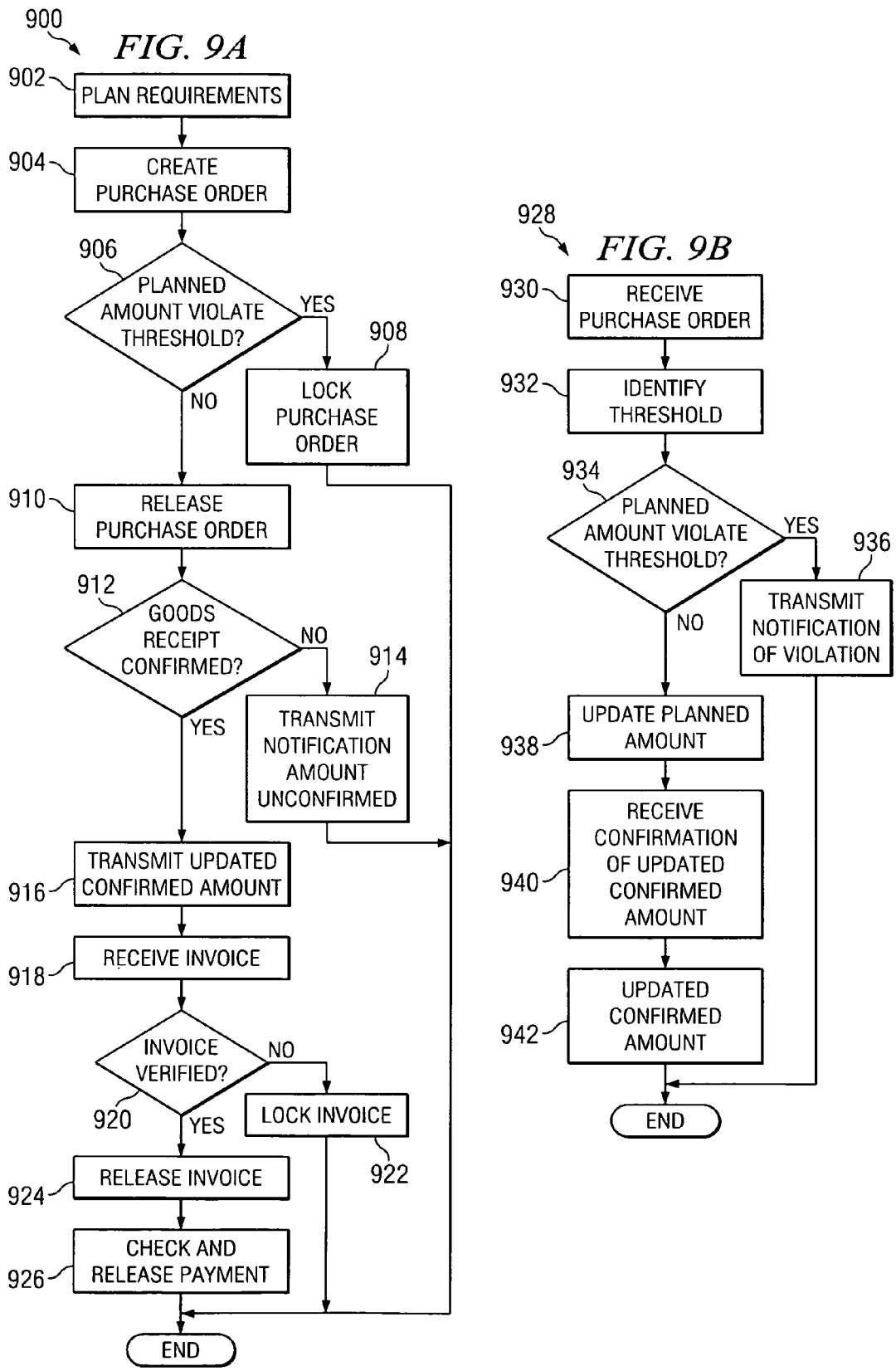

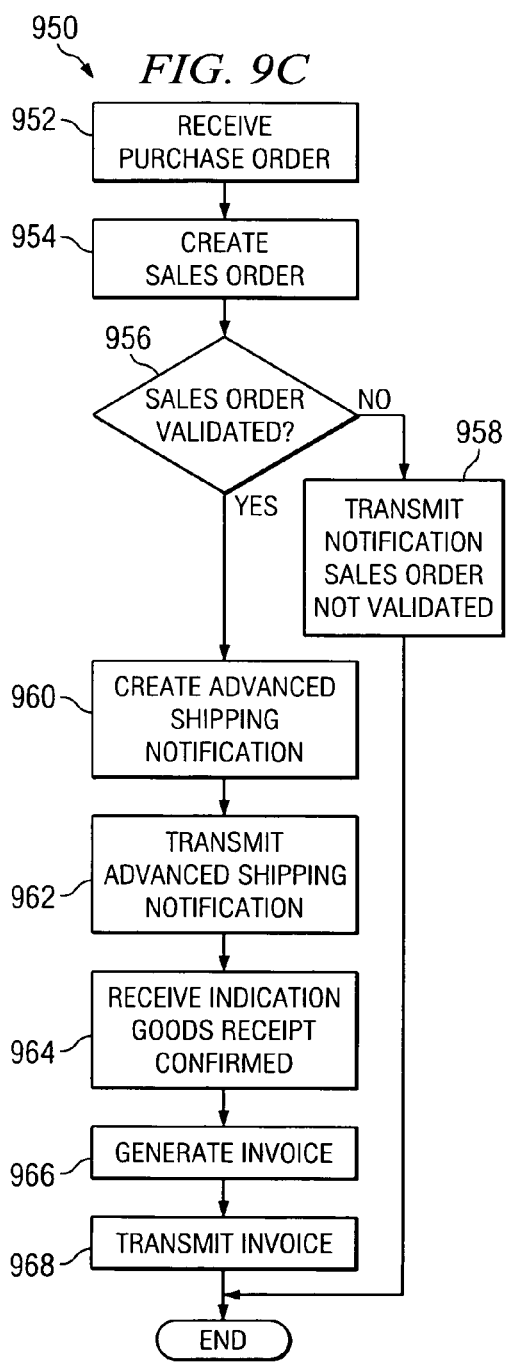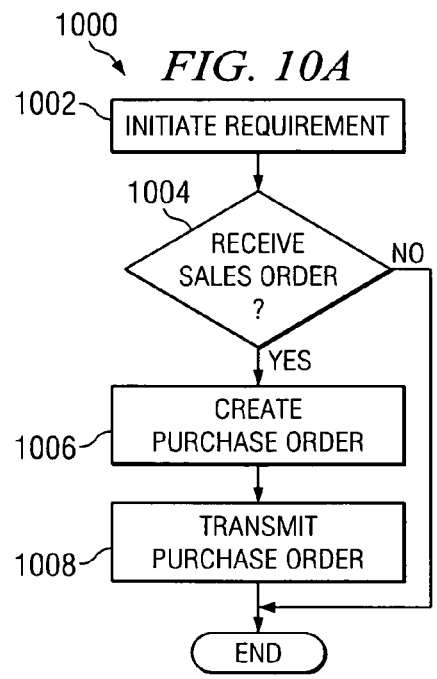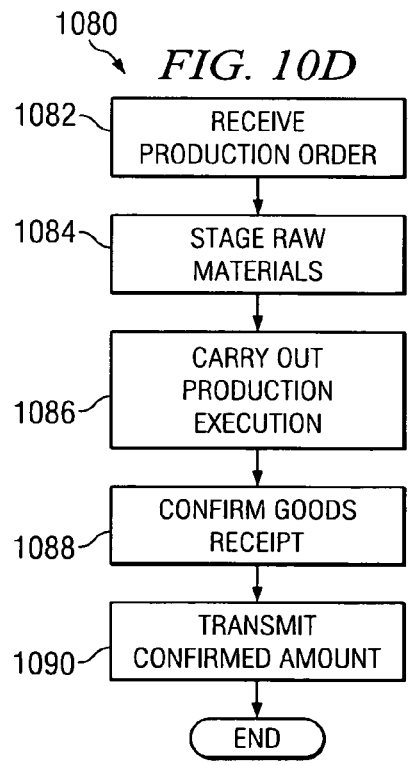

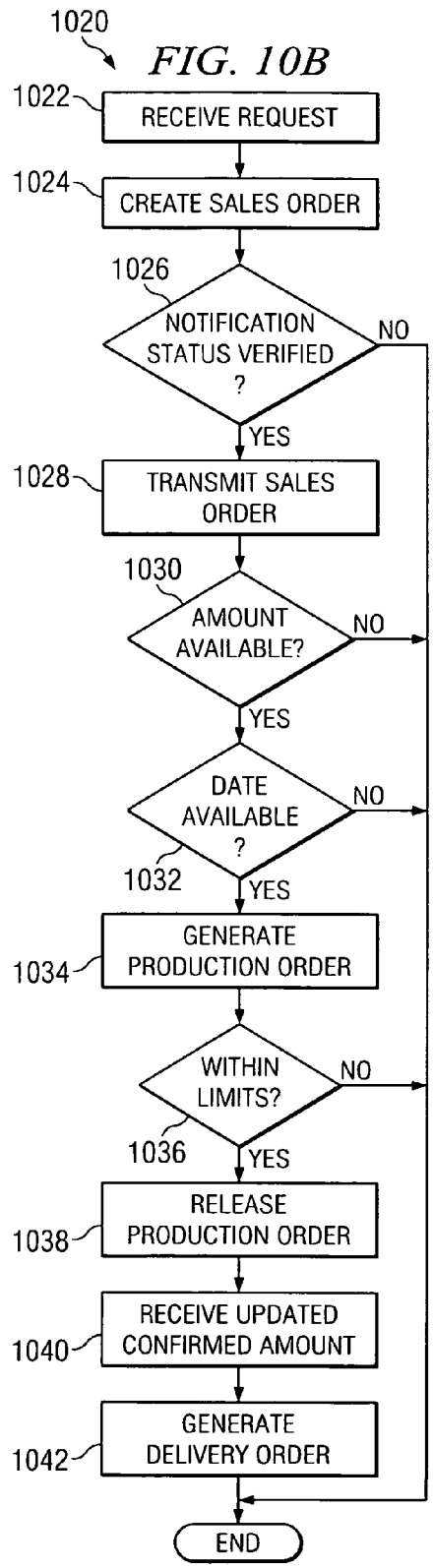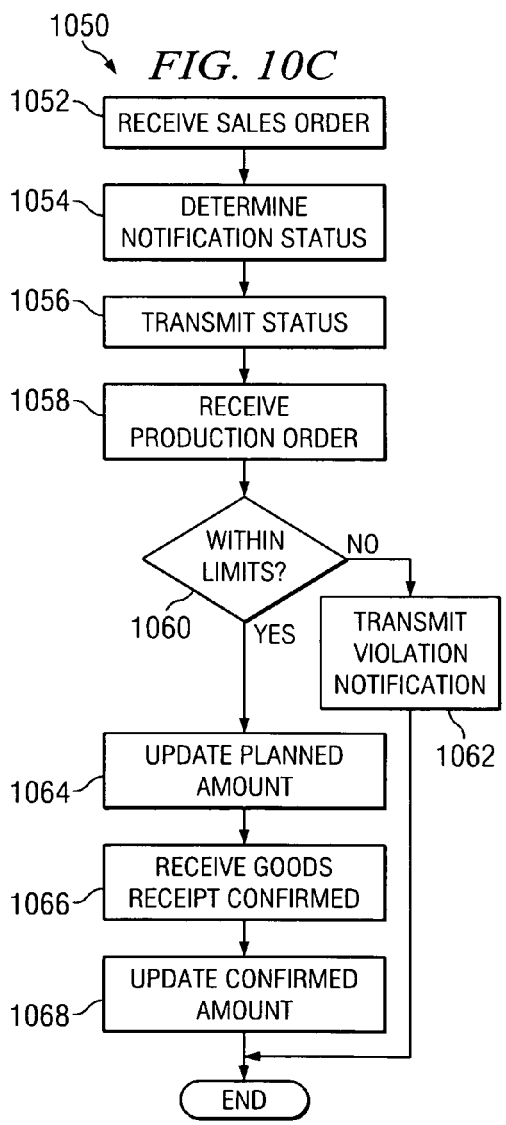

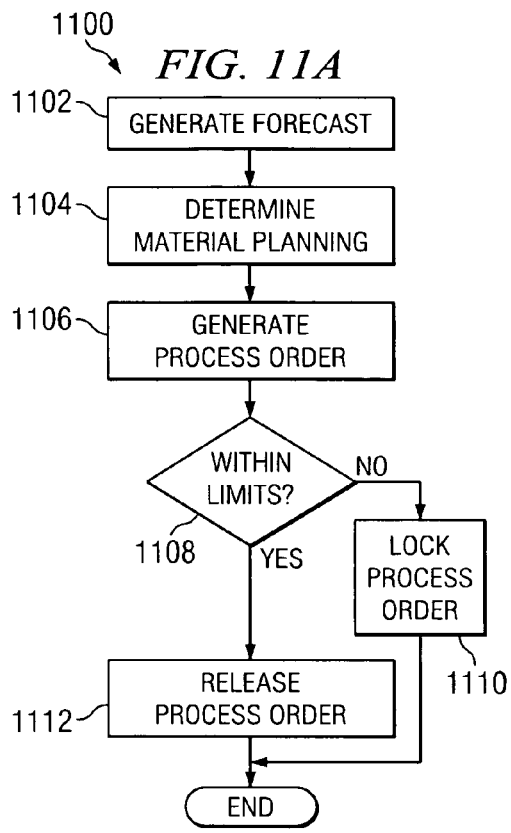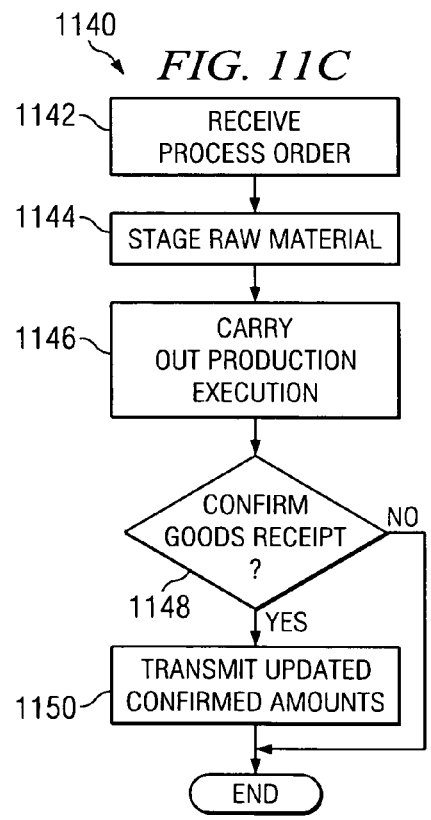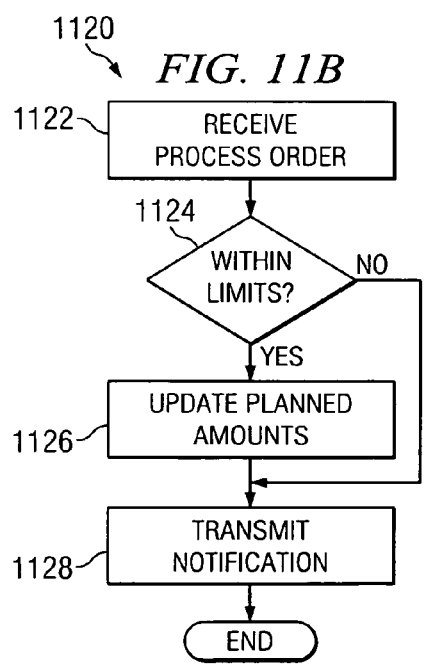

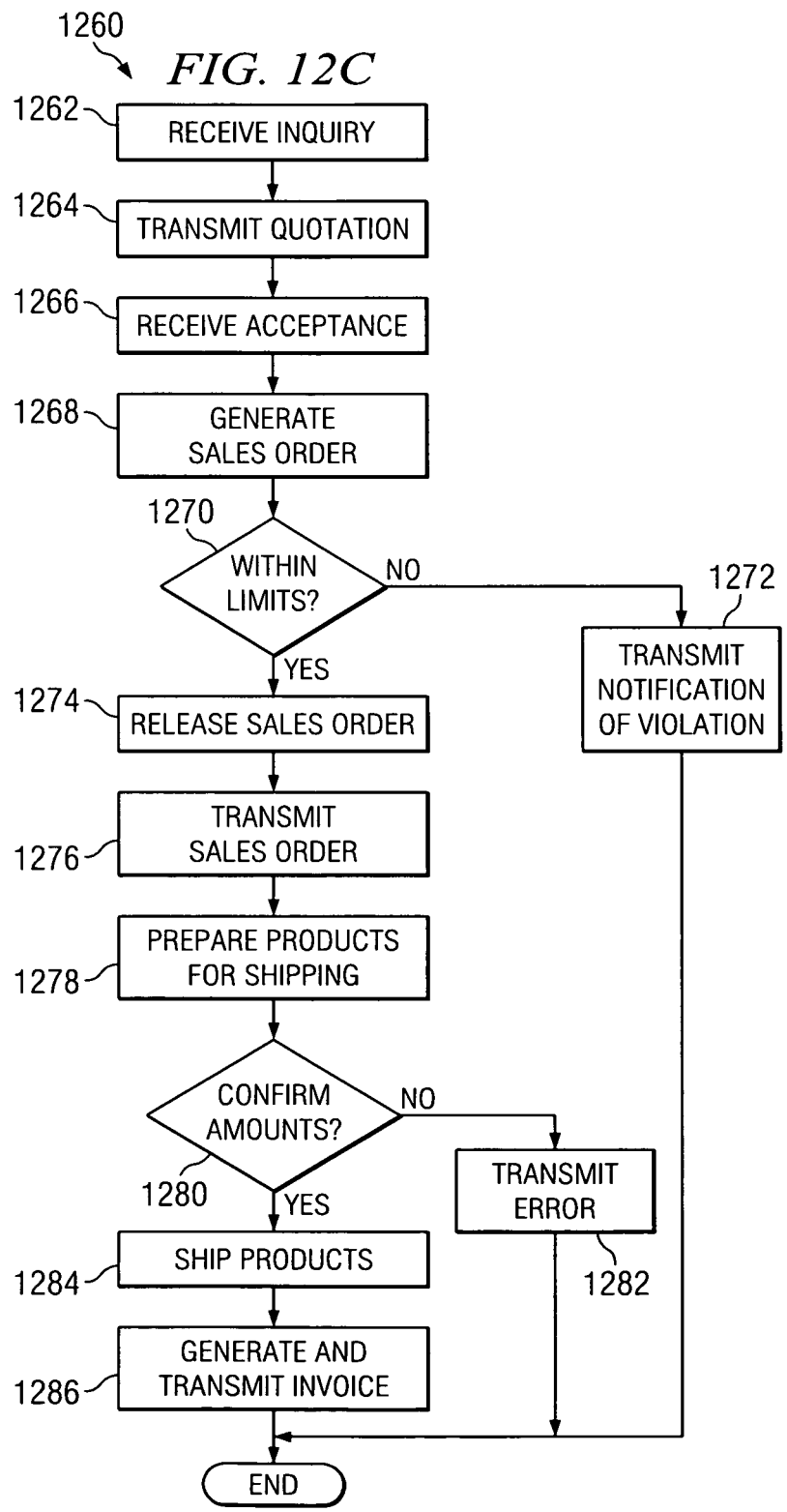

US 8,494,892 B2

TRACKING SUBSTANCES OVER VARIOUS BUSINESS PROCESSES

CLAIM OF PRIORITY

This application claims priority under 35 USC §119(e) to U.S. Patent Application Ser. No. 60/795,414, filed on Apr. 27, 2006, the entire contents of which are hereby incorporated by reference.

TECHNICAL FIELD

This disclosure relates to managing substances and, more particularly, to tracking substances over various business processes.

BACKGROUND

Enterprises may import, produce, use, sell, or ship substances that pose environmental and/or biological hazards during the course of business. In a attempt to avoid, reduce, or minimize exposure to these chemicals, government agencies have developed guidelines for handling such chemicals. For example, the European Commission adopted a proposal for a new European Union regulatory framework for handling hazardous chemicals, COM (2003) 644. Under this example current regulation, enterprises that handle more than one ton of a hazardous chemical substance per year must register with a central database. The aims of the proposed new regulation are to improve the protection of human health and the environment, while maintaining the competitiveness. More specifically, some legislation attempts to give greater responsibility to industry to manage the risks from chemicals and to provide safety information on the substances.

Other existing and proposed regulation may affect more companies by not distinguishing "old" and "new" chemicals, but applying to almost all chemical substances. In other words, it does not apply just to producers and/or companies placing chemicals on the market, but more of the downstream process (excluding consumers though): the downstream user is treated similar to importers or manufacturers of a substance if he uses the substance in a way not already registered by his supplier.

SUMMARY

The disclosure provides a method, software, and system for monitoring substances. In one embodiment, a method includes identifying a first document associated with a business process of an enterprise. A first volume of a substance based, at least in part, on the business document is determined. A second document associated with the business process of the enterprise is identified. A second volume of the substance based, at least in part, on the business document is determined. The first volume and the second volume is aggregated. A file associated with the business process is updated with at least the aggregated volume.

Implementations can include one or more of the following features. The material is currently possessed by the enterprise. The material is being acquired by the enterprise. An amount of a material is identified based, at least in part, on the first document. The material includes the substance. A specification associated with the material is identified. The first volume of the substance is determined based, at least in part, on the material amount and the material specification. The material comprises a plurality of substances including the substance. A volume for each of the plurality of substances is determined based, at least in part, on the material amount and the specification. A plurality of files based, at least in part, on the determined volumes is updated. Each file is associated with at least one of the plurality of substances. The business process comprises one of production, sales, or purchases. Aggregating the first volume and the second volume comprises adjusting the first volume using the second volume. The first volume comprises a volume produced by the enterprise, the second volume comprises a volume consumed by the enterprise. A first material including the substance is identified. The first volume is based, at least in part, on an amount of the first material. A second material including the substance is identified. The second volume is based, at least in part, on an amount of the second material. The first material is different from the second material. A list of substances is associated with the enterprise. The list of substances identifies a plurality of substances including the substance. A plurality of documents is identified based, at least in part, on the list of substances. A plurality of volumes of the substances is identified based, at least in part, on the plurality of documents. A plurality of files is updated with the determined volumes. The plurality of files associated with the substances are identified in the list of substances.

In some embodiments, a request from a user for a report associated with at least one substance is received. At least one document including amounts of the at least one substance is identified. Volumes of the at least one substance are determined. A report of the at least one substance is automatically generated based at least in part on the determined volumes.

Implementations can include one or more of the following features. The material is currently possessed by the enterprise. Determining volumes includes aggregating volumes of the at least one substance. A request to perform an action is received from a user. The action is automatically executed in response to at least the request. The at least one substance is currently possessed by the enterprise. The at least one substance is being acquired by the enterprise. The report is displayed through a Graphical User Interface (GUI). A business process is identified based, at least in part, on the request. At least one document associated with the business process is identified. The at least one document includes the document. A plurality of materials associated with the business process are identified. Each material includes the substance. The business process comprises one of production, sales, or purchases.

In some embodiments, a threshold associated with a substance managed by an enterprise is identified. At least one volume of the substance is identified. A violation of the substance threshold is automatically determined based, at least in part, on the at least one volume. An action is automatically determined in response to the violation.

Implementations can include one or more of the following features. A document associated with the substance is identified. An amount of a material associated with the document is identified. The material includes the substance. The at least one volume of the substance is determined based, at least in part, on the amount of the material. A specification associated with the material is identified. The at least one volume of the substance is determined based, at least in part, on the amount of the material. The threshold is identified in response, to at least, an event. The event comprises at least one of an expiration of a period of time, an update of the at least one substance volume, or a request by a user. The action comprises at least one of notifying an associated user or locking an business document. A plurality of volumes of the substance are identified. The plurality of volumes include the at least one volume. The plurality of volumes are aggregated. A violation of the threshold is determined based, at least in part, on the aggregated volumes.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 4A-C are flowcharts illustrating example methods for tracking substance volumes in accordance with some embodiments of the present disclosure;

FIGS. 5A-C are flowcharts illustrating example methods for monitoring substance volumes in accordance with some embodiments of the present disclosure;

FIGS. 7A-G are example displays for automatically monitoring substance in business processes;

FIGS. 9A-C are flowcharts illustrating example methods for monitoring substance volumes and associated business documents in accordance with some embodiments of the present disclosure;

FIGS. 10A-D are flowcharts illustrating example methods for monitoring substance volumes during production in accordance with some embodiments of the present disclosure;

FIGS. 11A-C are flowcharts illustrating example methods for monitoring substance volumes during production for stock; and FIGS. 12A-C are flowcharts illustrating example methods for monitoring substance volumes during sales and shipping material.

DESCRIPTION OF DRAWINGS

Figure 1:
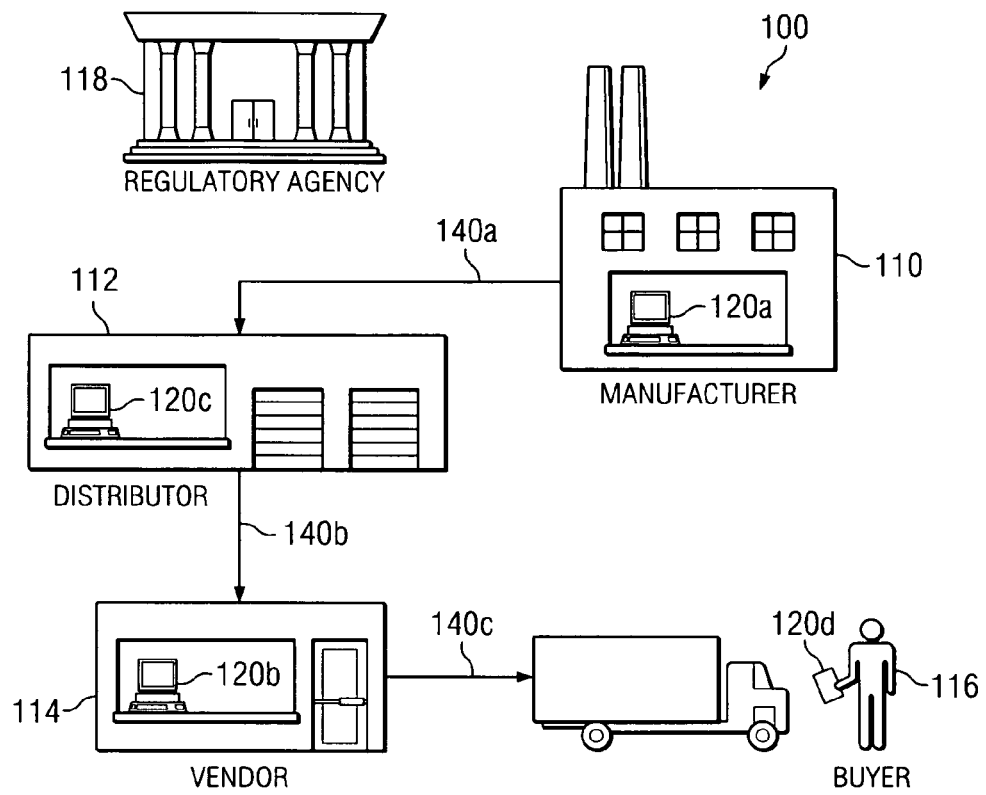
FIG. 1 is a block diagram illustrating a system in accordance with some embodiments of the present disclosure.

FIG. 1 is a diagram illustrating a system 100 including various example business and regulatory entities involved in substance management. For instance, substances may include chemicals that pose an environmental and/or biological hazard such that government regulations may place limits on how these substances may be handled. Regulations may be enacted and enforced by federal, state, local, and/or other government agencies or enforcement organizations to provide sufficient safeguards for certain substances. For example, the regulations may require that a particular substance not exceed a certain amount (e.g., volume), not be in proximity of another substance, not exceed a storage temperature, or violate other suitable criteria. To avoid violating such a regulation, a participating or associated enterprise may need to determine volumes produced, imported, or used not only on a material level but also on a substance level. In addition, a portion of system 100 may avert or modify a business process to maintain the handling of substances within certain limits. The business process may include producing, consuming, purchasing, selling, importing, exporting, or performing other suitable activities of an enterprise. In short, system 100 may perform one or more of the following processes: determine amounts of imported or produced substances, store these values and update on a regular basis, and monitor the tracked amounts.

In response to a substance violating or potentially violating a regulation, system 100 may perform remedial measures to reduce, prevent, minimize, or eliminate the violation such as, for example, preventing the purchase, production, and/or acceptance of substances. For example, system 100 may track amounts of substances that will be handled in the future (planned amounts), as well as amounts of substances currently handled (confirmed amounts). In response to the actual violation or potential violation, system 100 may also or alternatively lock or deny certain documents associated with planned and/or confirmed amounts, such as purchase orders, production orders, goods receipt, or other suitable documents. In doing so, business processes associated with the documents may be averted, thereby reducing, preventing, minimizing, or eliminating the actual or suspected violation of the regulation. In some embodiments, tracking and/or monitoring substances may include one or more of the following processes: (a) periodically generating a report for the different amounts of materials; (b) generating offline checks (e.g., listing of amounts per period/scenario) for a user in system 100; and/or (c) integrating on-line checks directly into the logistic processes of production, purchasing and sales.

At a high level, the illustrated system 100 includes a manufacturer 110, a distributor 112, a vendor 114, a buyer 116, and a regulatory agency 118. Of course, this illustration is for readability purposes only and system 100 may include other elements and/or different elements involved in the distribution of substances as appropriate. Manufacturer 110 is generally an entity that manufacturers articles, substances, or other commodities to sell and/or use. For example, manufacturer 100 may manufacture chemical substances to sell to other entities such as distributor 112, vendor 114, or buyer 116. Manufacturer 110 may engage in the production, preparation, propagation, compounding, conversion, or processing of substances, either directly or indirectly, by extraction from substances of natural origin, or independently by means of chemical synthesis, or by a combination of extraction and chemical synthesis. In some instances, manufacturer 110 transforms, by means of tools and/or processing steps (e.g., chemical reactions), raw materials into substances for sale. Manufacturer 110 may include one or more manufacturing facilities located at a single geographic location as well as one or more remotely distributed manufacturing facilities. In this case, manufacturer 110 may follow guidelines for handling raw materials as well as manufactured substances to increase, maximize, or otherwise enhance safety. Such guidelines may be dictated by government regulation and/or internal guidelines provided by manufacturer 110 or some other management. In tracking and monitoring substances associated with manufacturer 110, manufacturer 110 may include a computing device 120a (discussed in more detail in FIG. 2) that tracks and monitors substances handled by manufacturer 110. Computing device 120a automatically tracks and monitors certain regulated substances, as well as provides reports of certain substances to users of device 120a for allowing offline monitoring. In response to determined or suspected violation of a threshold, device 120a may automatically perform steps to reduce, minimize, or eliminate the violation.

Distributor 112 may be any entity that receives substances from manufacturer 110 and distributes them to other entities for use. Typically, distributor 112 does not directly market, sell or otherwise provide substances to buyer 116 but, instead, provides substances to vendor 114. Distributor 112 may provide one or more of the following services associated with the substance: inventory, warehousing, distribution, and/or transportation. Since distributor 112 may not immediately distribute substances received from manufacturer 110, distributor 112 may store or otherwise retain the received substances for a period of time. As a result, distributor 112 may follow guidelines for handling and/or retaining substances in order to minimize, reduce, or eliminate potential hazards caused by storing such chemicals, such as within a certain proximity of other or the same substances. As with manufacturer 110, such guidelines may be dictated by government regulation and/or internal guidelines provided by distributor 112 or other associated entity (e.g., manufacturer 110). Distributor 112 may include a single storage facility, multiple storage facilities at a single site, or multiple storage facilities geographically distributed.

Vendor 114 is an entity that typically provides substances directly to buyer 116. In some instances, vendor 114 buys or otherwise receives substances from distributor 112 and then may sell these substances to buyer 116. As with distributor 112, vendor 114 may provide one or more of the following services associated with the substance: inventory, warehousing, distribution, and/or transportation. As a result, vendor 114 may not immediately distribute substances received from distributor 112. In performing any of these services, vendor 114 may follow guidelines for handling such substances. As discussed above, the guidelines may be provided by a government agency, such as regulatory agency 118, and/or an internal agency, or the guidelines may be based, at least in part, on federal regulations and/or company regulations. Vendor 114 may include a single retail facility, one or more retail facilities at a single geographic location, and/or a plurality of retail facilities geographically distributed. In some cases, two or more of the illustrated entities may represent portions of the same legal entity or affiliates. For example, manufacturer 110 and distributor 112 may be departments within one chemical company. In another example, the manufacturing chemical company may sell substances directly to certain buyers 116 (say, a government agency) and provide substances to other buyers 116 via third party vendors 114.

Buyer 116 comprises any suitable individual or enterprise that consumes or otherwise uses substances and/or services associated with the substances within system 100. Typically, buyer 116 is an enterprise who acquires or imports substances and/or associated services for consumption, use, or enjoyment. After receiving substances, buyer 116 may engage in the production, preparation, propagation, compounding, conversion, or processing of the received substances, either directly or indirectly by extraction from substances of natural origin, or independently by means of chemical synthesis, or by a combination of extraction and chemical synthesis. In some instances, buyer 116 transforms, by means of tools and/or processing steps, substances into other substances and/or services used by buyer 116. In processing, tooling, or otherwise consuming the received substances, regulatory agency 118 may provide guidelines that buyer 116 may follow to reduce, minimize, or eliminate hazards associated with the substances. For example, buyer 116 may be a semiconductor manufacturer that consumes large amounts of deionized water when manufacturing integrated circuits. Since deionized water is a neurotoxin, the semiconductor buyer 116 may be required by the Office of Health and Safety Association (OSHA) to handle the deionized water with protective gear such as goggles, gloves, and long sleeve coats.

Regulatory agency 118 includes any suitable government and/or company agency that regulates and and/or monitors certain operations. Typically, regulatory agency 118 is a government agency that is assigned to enforce laws, regulations, and/or orders passed by legislative process. For example, regulatory agency 118 may be the Food and Drug Administration (FDA) that regulates the distribution of certain chemical substances. In some instances, regulatory agency 118 monitors regulated operations such as mining, waste disposal, dam construction, chemical manufacturing, and public water supply. In this case, regulatory agency 118 may assist in developing regulations, monitoring activities, enforcing laws and educating the public. As mentioned above, regulatory agency 118 may be an internal or external agency that regulates substances handled by the enterprise. In this case, regulatory agency 118 may follow internal guidelines that reflect criteria at least partially established by a government entity.

In one aspect of operation, manufacturer 110 receives a purchase order for a substance 140a. Manufacturer 110 produces the requested substance or picks an already produced substance based, at least in part, on the purchase order and ships (when appropriate) the substance 140a to distributor 112. Distributor 112 may have received a purchase request from vendor 114 for the substance 140a prior to or after the request was transmitted to the manufacturer 110. In some embodiments, distributor 112 may have a standing order from vendor 114 for a certain amount of substance 140a. After receiving sufficient substance 140a, distributor 112 transmits at least a portion of the substance (illustrated as 140b) to vendor 114. In turn, vendor 114 sells at least some of the substance (shown as 140c) to buyer 116. During the overall process or individual business process, computer 120 may track and monitor substance amounts in accordance with regulations provided by regulatory agency 118.

Figure 2:
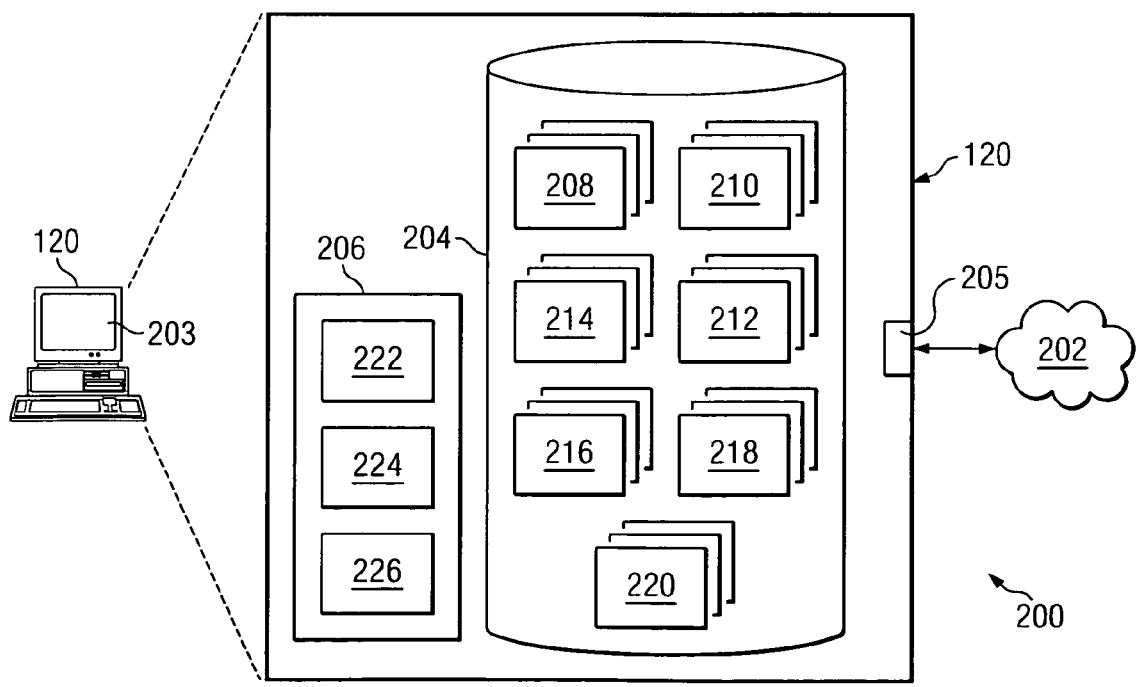
FIG. 2 illustrates a tracking system 200 for tracking substance volumes in business processes in accordance with some embodiments of the present disclosure.

FIG. 2 illustrates a tracking system 200 for tracking substance volumes in business processes in accordance with one embodiment of the present disclosure. A business process may include producing, consuming, purchasing, selling, importing, exporting, and/or performing other suitable activities of an enterprise. For example, semiconductor processing may include purchasing silicon, consuming acids, and deionized water when processing the silicon, producing integrated circuits, and/or selling the packaged circuits to consumers, vendors, or other entities. As discussed above, certain substances 140 handled in business processes may pose a biological and/or environmental hazard or pose other safety concerns such that their use is regulated by government agencies and/or other agencies. To satisfy guidelines set by an agency such as regulatory agency 118, the enterprise may track and monitor substances 140 to identify violations or potential violations as well as take steps to avoid violations. Tracking may include confirming amounts of substances currently stored, used, or otherwise handled as well as determining amounts of substances that the enterprise is intending on acquiring. In some embodiments, system 200 may perform one or more of the following processes: evaluate certain material movements/inventory booking with respect to their volumes/amounts, break down materials to a list of constituents (e.g., percentages), and condense amounts based on constituents and business processes. In response to processing the volume amounts, the enterprise may take steps to satisfy guidelines that are intended to regulate the substances. In some embodiments, the user may customize or adapt the default implementation and, thus, allow the user to influence/change monitoring and tracking determinations.

To assist in tracking and monitoring substances in an enterprise, system 200 may be a single computer 120 or any portion (including all) of a distributed system including at least one computer 120, perhaps communicably coupled to a network 202. For example, computer 120 may comprise a portion of an information management system that provides a number of software applications to any number of clients. Alternatively, computer 120 may comprise a client processing information in a distributed information management system or enterprise network via one or more software applications. Computer 120 is generally intended to encompass any suitable processing device. For example, although FIG. 2 illustrates computer 120 that may be used with the disclosure, system 200 may be any computer or processing device such as, for example, a blade server, a server pool, general-purpose personal computer (PC), Macintosh, workstation, Unix-based computer, or any other suitable device. In other words, the present disclosure contemplates computers other than general purpose computers as well as computers without conventional operating systems. Computer 120 may be adapted to execute any operating system including Linux, UNIX, Windows Server, or any other suitable operating system. While computer 120 is illustrated as associated with a single entity in FIG. 1 and FIG. 2, computer 120 may be distributed among multiple entities. For example, computer 120 may track and monitor substance volumes for both manufacturer 110 and distributor 112. Alternatively, each element in FIG. 1 may include a separate computer 120. In this case, the included computer 120 may track and monitor substances in business processes associated with a single element. In the event that multiple elements include separate computers 120, the different computers 120 may be incompatible. In the case of incompatibility, computer 120 may include additional features and/or functions operable to translate or otherwise convert between forms compatible with the different computers 120. In some embodiments, the conversion may be transparent to a user of system 200. "Client," "user," and the particular entity may be used interchangeably as appropriate. Regardless, system 200 may be any system operable to track and monitor substance volumes and automatically generate a notification based, at least in part, on a violation of criteria. The term "automatically," as used herein, generally means that the appropriate processing is substantially performed by at least a portion of the automated system. This configuration often provides a substantially flexible and inexpensive mechanism for automatically monitoring the handling of regulated substance in business processes.

Computer 120 includes a Graphical User Interface (GUI) 203, network interface 205, memory 204, and processor 206. FIG. 2 only provides one example of a computer that may be used with the disclosure. The present disclosure contemplates computers other than general purpose computers, as well as computers without conventional operating systems. As used in this document, the term "computer" is intended to encompass a mainframe, a personal computer, a client, a server, a workstation, a network computer, a personal digital assistant, a mobile phone, or any other suitable processing device. Computer 120 may be operable to receive input from and display output through GUI 203 for the particular user.

GUI 203 comprises a graphical user interface operable to allow the user of computer 120 to interact with processor 206. The term "computer 120" and the phrase "user of computer 120" may be used interchangeably, where appropriate, without departing from the scope of this disclosure. Generally, GUI 203 provides the user of computer 120 with an efficient and user-friendly presentation of data provided by computer 120. GUI 203 may comprise a plurality of displays having interactive fields, pull-down lists, and buttons operated by the user. And in one example, GUI 203 presents an explorer-type interface and receives commands from the user. It should be understood that the term graphical user interface may be used in the singular or in the plural to describe one or more graphical user interfaces in each of the displays of a particular graphical user interface. Further, GUI 203 contemplates any graphical user interface, such as a generic web browser, that processes information in computer 120 and efficiently presents the information to the user. Network 202 can accept data from the user of computer 120 via the web browser (e.g., Microsoft Internet Explorer or Netscape Navigator) and return the appropriate HTML or extensible Markup Language (XML) responses.

Network 202 facilitates wireless or wireline communication between system 200 and any other computer. Network 202 may communicate, for example, Internet Protocol (IP) packets, Frame Relay frames, Asynchronous Transfer Mode (ATM) cells, voice, video, data, and other suitable information between network addresses. Network 202 may include one or more local area networks (LANs), radio access networks (RANs), metropolitan area networks (MANs), wide area networks (WANs), all or a portion of the global computer network known as the Internet, and/or any other communication system or systems at one or more locations. Computer 120 may include network interface 205 for communicating with other computer systems over network 202 such as, for example, in a client-server or other distributed environment. As appropriate, computer 120 generates requests and/or responses and communicates them to another client, user, server, or other computer systems located in or beyond network 202. For example, computer 120 may receive data for documents associated with business processes. Generally, interface 205 comprises logic encoded in software and/or hardware in any suitable combination to allow computer 120 to communicate with network 202. More specifically, interface 205 may comprise software supporting one or more communication protocols and communication hardware operable to communicate physical signals.

Memory 204 may include any memory or database module and may take the form of volatile or non-volatile memory including magnetic media, optical media, Random Access Memory (RAM), Read Only Memory (ROM), removable media, or any other suitable local or remote memory component. In the illustrated embodiment, memory 204 includes production business documents 208, purchase business documents 210, sales business documents 212, goods business documents 214, tracking documents 216, regulations 218, and reports 220. Production business documents 208 includes one or more entries or data structures that identifies materials that the associated enterprise has and/or intends to produce or consume. In some embodiments, produced and consumed amounts are both included in production business documents 208 because consumed amounts may offset produced amounts. For example, production business document 208 may be associated with a chemical manufacturer and indicate that a manufacturer 110 produced two tons of hydrofluoric acid on a given date and consumed one ton of the acid on the same date at a given plant. As a result of including both produced and consumed amounts, the produced amounts may be offset by the consumed amounts before determining whether the actual amounts violate a regulation associated with the substance.

In general, production business document 208 may identify or include information operable to identify one or more of the following: document category, document type, material, order type, concentration, amount produced, amount consumed, item category, production date, consumption date, production plant, storage location, consumption location, or any other suitable information associated with the production and/or consumption of material. The document category may identify technical properties of an associated production order. For example, production business document 208 may include one or more of the following document categories:

| Doc. category | Description |
| --- | --- |
| 10 | PP Production Order |
| 40 | Process Order |

The categories identified above are for illustration purposes only. Production business documents 208 may include the same, some, or different categories without departing from the scope of this disclosure. In some embodiments, the document category may be used as standard filter criteria to select specific production data. In some embodiments, production business document 208 includes a single document category. The document type often identifies a purpose associated with production business document 208. For example, production business documents 208 may include one or more of the following document types:

| Document type | Doc. category | Description |
| --- | --- | --- |
| PP01 | 10 | Standard production order |
| PP02 | 10 | Standard production order (external NA) |
| PI01 | 40 | Process order (internal number assignment) |
| PI02 | 40 | Process order (external number assignment) |

The types identified above are for illustration purposes only and production business documents 208 may include the same, some, or different types without departing from the scope of this disclosure. In some embodiments, the document types may be customized as filter criteria and, thus, computer 120 may not track orders with certain document types. For example, computer 120 may not track orders having a document type for "costing" because such orders may not include material mass amounts. In some embodiments, production business documents include one or more of the following item categories:

| Item category | Description |
| --- | --- |
| L | Stock item |
| R | Variable-size item |

The categories identified above are for illustration purposes only. Production business documents 208 may include the same, some, or different categories without departing from the scope of this disclosure. The item category may also be used as a customized filter criteria. For example, computer 120 may not track production orders with an item category of "document item" because the order may not have material mass amounts. Each production business document 208 may be associated with an enterprise, a substance, a department of an enterprise, a date range, and/or any other suitable aspect of production.

Purchase business documents 210 includes one or more entries or data structures that identifies materials that an associated enterprise has and/or intends to purchase and/or import. In some embodiments, purchase business documents 210 may include both purchased and imported amounts because both types of amounts indicate substances that an entity is acquiring. For example, purchase business document 210 may be associated with a semiconductor manufacturer and indicates that the manufacturer purchased two tons of hydrofluoric acid on a given date. As a result of including both purchased and imported amounts, the purchased amounts may be aggregated with the imported amounts before determining whether the actual amounts violate a regulation associated with the substance. In general, purchase business document 210 may identify or include information operable to identify one or more of the following: document category, document type, material, concentration, amount purchased, amount imported, item category, purchasing organization, order category, order type, purchase date, delivery date, import date, origination, storage location, or any other suitable information associated with the purchasing and/or importing of material. The document category may identify technical properties of an associated production order. For example, purchase business document 210 may include one or more of the following document categories:

| Doc. category | Description |
| --- | --- |
| L | Scheduling agreement |
| F | Purchase order |
| B | Purchase requisition |

The categories identified above are for illustration purposes only. Purchase business documents 210 may include the same, some, or different categories without departing from the scope of this disclosure. In some embodiments, a contract is a type of outline purchase agreement against which release orders (releases) can be issued for agreed materials or services as and when required during a certain overall timeframe. In some embodiments, a quotation is an offer by a vendor to an enterprise regarding the supply of materials or performance of services subject to specified conditions. In some cases, a quotation includes the total quantity of an item as well as the delivery date of an offered material or service. Purchase business documents 210 may include one or more of the following documents types:

| Type | Doc category | Description |
| --- | --- | --- |
| NB | F | Standard Purchase |
| LP | L | Scheduling agreement |
| LU | L | Transport schedule agreement |

The types identified above are for illustration purposes only. Purchase business documents 210 may include the same, some, or different types without departing from the scope of this disclosure. In some embodiments, the document types may be customized as filter criteria, and, thus, computer 120 may not track orders with certain document types. For example, computer 120 may not track orders having a document type "framework order" because such purchase orders may not include material mass amounts. Other purchase orders may not include mass amounts and, thus, may not be useful as filter criteria such as, in some embodiments, value contracts. Each purchase business document 210 may be associated with an enterprise, a substance, a department of an enterprise, a date range, and/or any other suitable aspect of production.

Sales business documents 212 includes one or more entries or data structures that identifies materials that an associated enterprise has and/or intends to sell and/or export. In some embodiments, sales business documents 212 include both sold amounts and exported amounts because both types of amounts indicate substances being removed from an entity. For example, sales business document 212 may be associated with a semiconductor manufacturer and indicates that the manufacturer sold two million central processing units (CPUs) and will export the CPUs in two weeks. As a result of including both sold and exported amounts, the sold amounts may be aggregated with the export amounts before determining whether the actual amounts violate a regulation associated with the substance. In general, sales business document 212 may identify or include information operable to identify one or more of the following: document category, document type, material, concentration, amount sold, amount exported, item category, sales organization, order category, order type, sold date, delivery date, export date, destination, storage location, or any other suitable information associated with the selling and/or exporting of material. Sales business document 212 may include one or more of the following document categories:

| Document category | Description |
|---|---|
| C | Order |
| E | Scheduling agreement |
| J | Delivery |

The categories identified above are for illustration purposes only. Sales business documents 212 may include the same, some, or different categories without departing from the scope of this disclosure. Sales business documents 212 may include one or more of the following document types:

| Document type | Document category | Description |
|---|---|---|
| DS | E | Scheduling Agreement |
| DL | E | Document type Scheduling Agreement |
| OR | C | Standard Order |
| SO | C | Rush Order |

The types identified above are for illustration purposes only. Sales business documents 212 may include the same, some, or different types without departing from the scope of this disclosure. In some embodiments, the document types may be customized as filter criteria, and, thus, computer 120 may not track orders with certain document types. For example, computer 120 may not track orders having a document type "sales information" because such purchase orders may not include material mass amounts. Sales business documents 212 may include one or more of the following schedule line categories:

| Schedule line category | Document category | Description |
|---|---|---|
| CP | C | MRP |
| CN | C | No mat. planning |

The schedule line categories identified above are for illustration purposes only. Sales business documents 212 may include the same, some, or different schedule line categories without departing from the scope of this disclosure. In some embodiments, the document types may be customized as filter criteria, and, thus, computer 120 may not track orders with certain schedule line categories. For example, computer 120 may not track orders having a schedule line category "no inventory mgmt" because such purchase orders may not include material mass amounts. Each sales business document 212 may be associated with an enterprise, a substance, a department of an enterprise, a date range, and/or any other suitable aspect of production.

Goods business documents 214 includes one or more entries or data structures that identifies materials that an associated enterprise receives and/or delivers. For example, goods business document 214 may be associated with a semiconductor manufacturer and indicates that the manufacturer received two million circuit mounts on a given date and delivered the CPUs on another date. As a result of including both good receipts and goods issues, the receipts and issues may be used to verify confirmed substance amounts. For example, goods receipts may be used to determine confirmed purchases data and/or repetitive manufacturing data. Goods issues may be used to determine delivery data and/or sales data. In general, goods business document 214 may identify or include information operable to identify one or more of the following: document category, document type, transaction/event type, material, concentration, amount received, amount delivered, item category, sold date, received date, delivery date, destination, storage location, or any other suitable information associated with the receiving and/or delivering material. Goods business document 214 may include one or more of the following transaction/event types:

| Transaction/event type | Description |
|---|---|
| WF | Goods receipt for order |
| WE | Goods Receipt for Purchase Order |
| WL | Goods Issue for Delivery |
| WS | Goods movement in Repetitive Manufacturing |
| WA | GI, tfr. posting, other goods movement |

The transaction/event types identified above are for illustration purposes only. Goods business documents 214 may include the same, some, or different transaction/event types without departing from the scope of this disclosure. In some embodiments, the transaction/event types may be customized as filter criteria, and, thus, computer 120 may not track orders with certain transaction/event types. For example, computer 120 may not track orders having a transaction/event type "Inventory Sampling Procedure" because such purchase orders may not include material mass amounts. Goods business documents 214 may include one or more of the following document types:

| Document type | Description |
|---|---|
| WA | Goods issue |
| WE | Goods receipt |

The types identified above are for illustration purposes only. Goods business documents 214 may include the same, some, or different types without departing from the scope of this disclosure. In some embodiments, the document types may be customized as filter criteria, and, thus, computer 120 may not track orders with certain document types. For example, computer 120 may not track orders having a document type "Price Change" because such purchase orders may not include material mass amounts. Each goods business document 214 may be associated with an enterprise, a substance, a department of an enterprise, a date range, and/or any other suitable aspect of production.

Tracking tables 216 includes one or more entries or data structures that identifies substance amounts in a business process. For example, tracking table 216 may include both planned and confirmed amounts of a particular substance for manufacturer 110. In some embodiments, tracking tables 216 include aggregated planned amounts and aggregated confirmed amounts for a particular substance. Alone or in combination, tracking tables 216 may include aggregated amounts for associated business processes. Tracking table 216 may be associated with any suitable criteria. For example, tracking table 216 may include or otherwise be associated with one or more of the following criteria: regulation, plant, material, specification, tracking substance, date, amount, planned amount, supplier, country of origin, country of receiver, or other suitable criteria associated with a substance and/or business process.

Regulations 218 include any parameters, variables, algorithms, instructions, rules, objects or other directives for monitoring substances in distribution system 100. For example, regulation 218 may be used to identify planned amounts of a particular substance that would violate a government regulation and generate a notification in response to the event. Such an event may include exceeding an amount, storage temperature, proximity to other substances, violating a lower limit, violating an upper limit, or any other suitable event. As mentioned above, a material may include one or more constituent substances. In this case, regulation 218 may include a material specification that identifies constituent substances. For example, regulation 218 may identify that a certain material includes both hydrogen peroxide and deionized water in certain proportions. Based on this material specification, computer 120 may determine amounts for each substance based, at least in part, on the material specification. In addition to monitoring substances in accordance with regulations, regulations 218 may also include or otherwise identify actions for computer 120 to perform in response to the event. For example, the actions may include one or more of the following: display message through GUI 203, transmit message to a user, block document associated with a business process (e.g., purchase order), or any other suitable process.

Based, at least in part on tracking tables 216, reports 220 include one or more entries or data structures that identifies information associated with a tracked substance in system 100. For example, report 220 may identify planned amounts and confirmed amounts of a substance in a particular business process for displaying through GUI 203. Report 220 may be based on any suitable criteria. For example, report 220 may be associated with one or more of the following criteria: regulation, plant, material, specification, tracking substance, date, amount, planned amount, supplier, country of origin, country of receiver, or other suitable criteria associated with a substance and/or business process. In some embodiments, report 220 includes aggregated substance amounts for display through GUI 203. In addition, report 220 may include information identifying actions that a user of computer 120 may perform in response to displayed information. For example, report 220 may include instructions for displaying a graphical element that the user may select to block a business document associated with the substance.

In general, business documents 208, purchase business documents 210, sales business documents 212, goods business documents 214, tracking tables 216, regulations 218, and reports 220 may be stored in any suitable format such as, for example, an eXtensible Markup Language (XML) document, a flat file, comma separated value (CSV) file, a name-value pair file, SQL table, or others. Indeed, each business document 208, purchase business document 210, sales business document 212, goods business document 214, tracking table 216, regulation 218, and report 220 may be a temporary or a persistent data structure without departing from the scope of the disclosure. Business documents 208, purchase business documents 210, sales business documents 212, goods business documents 214, tracking tables 216, regulations 218, and reports 220 may be created, updated, or supplied by computer 120, a third-party software vendor, or any appropriate user of any computer in system 100, loaded from a default profile, or received via network 202.

Processor 206 executes instructions and manipulates data to perform operations of computer 120. Although FIG. 2 illustrates a single processor 120 in computer 110, multiple processors 206 may be used according to particular needs, and reference to processor 206 is meant to include multiple processors 206 where applicable. In the illustrated embodiment, processor 206 executes tracking engine 222, monitoring engine 224, and reporting engine 226 at any appropriate time such as, for example, in response to a request or input from a user of computer 120 or any appropriate computer system coupled with network 202. Tracking engine 222 is any software operable to track substance amounts in business processes of system 100. In some embodiments, tracking engine 222 may identify relevant material and the constituents of the material in one or more business processes, determine substance volumes of the identified constituents, and update tracking tables 216 with the substance volumes along with associated information (e.g., plant, country, date). In determining substance volumes, tracking engine 222 may determine planned and confirmed substance amounts based, at least in part, on production business documents 208, purchase business documents 210, and/or sales business documents 212 and automatically generate and/or update tracking tables 216 based, at least in part, on the planned and confirmed amounts. In some embodiments, prior to updating tracking tables 216, tracking engine 222 may condense or otherwise aggregate substance amounts based, at least in part, on associated business processes. For example, tracking engine 222 may add confirmed amounts for a particular business process and add planned amounts for the particular process and update tracking tables 216 with the aggregated confirmed amounts and the aggregated planned amounts.

Tracking engine 222 may determine amounts of a substance based on any suitable process. For example, in production, tracking engine 222 may determine the amount of a substance based on the output of a chemical reaction. In this case, tracking engine 222 may determine whether substances are produced or consumed during a chemical reaction. In some embodiments, tracking engine 222 may perform the following steps: (a) determine all constituents (on substance level) for each material on the input side of the chemical reaction; (b) determine all constituents (on substance level) for the material on the output side of the chemical reaction; (c) calculate the 'percentage contained' for each substance on the input and output side; (d) calculate the difference between the output amount and the input amount for each identical substance; and (e) identify the substance is produced if the difference is greater than zero, consumed if the difference is negative, or neither if the difference is zero. In some embodiments, tracking engine 222 may perform the following steps: (a) determine constituents (on the substance level) for each material on the input side of the chemical reaction; (b) determine constituents (on the substance level) for the material on the output side of the chemical reaction; (c) calculate the 'percentage contained' for each substance on the output side which does not appear on the input side; and (d) calculate the amount of the produced material by multiplying the amount of the material produced times the percentage. In the case of determining purchased amounts, tracking engine 222 may perform the following steps: (a) determine whether the purchase is an import or not; (b) identify amount of purchased material from purchased business documents 210 (e.g., purchase order, purchase requisition, goods receipt); (c) determine constituents (on substance level) for the material; and (d) calculate 'percentage contained' for each substance.

Tracking engine 222 may filter the retrieved planned and confirmed data in accordance with certain criteria. For example, the criteria may identify particular substances or materials including particular substances that are regulated. As a result, tracking engine 222 may not track unregulated substances. Other suitable criteria for filtering substance amounts may include a classification of a material, a tag, date range, plant, and/or other suitable filters associated with regulated substances. Since tracking engine 222 may track materials including one or more regulated substances, tracking engine 222 may break down the material into its constituent substances or otherwise identify the constituent substances of the material. In doing so, tracking engine 222 may be able to separate regulated and unregulated substances that are included in a material and only track the regulated substance. Tracking engine 222 may update tracking tables 216 with the planned and confirmed amounts of regulated substances. In some embodiments, tracking engine 222 may combine, condense, or otherwise aggregate the planned amounts and the confirmed amounts prior to updating tracking tables 216. For example, tracking engine 222 may determine planned amounts of a particular substance based on production business documents 208 and aggregate the planned amounts for that particular substance. Tracking engine 222 may perform a similar operation for both purchased business documents 210 and sales business documents 212 and update tracking tables 216 with each of the aggregated planned amounts. Tracking engine 222 may also aggregate confirmed amounts for the particular substances for each set of business documents.

Monitoring engine 224 includes any software operable to monitor substances in distribution system 100. For example, monitoring engine 224 may identify criteria included in regulations 218 and compare the criteria to planned and confirmed amounts in tracking tables 216. As discussed above, the criteria may include amount limits, relative limits, proximity limits, upper limits, lower limits, or other suitable criteria. In response to at least the planned amount or the confirmed amount of a substance violating criteria, monitoring engine 224 may automatically generate a notification and, alone or in combination, perform an action to reduce, prevent, eliminate, or minimize a violation. In some embodiments, monitoring engine 224 retrieves or otherwise identifies the action from an associated regulation 218. Monitoring engine 224 may automatically perform one or more of the following actions: display message through GUI 203, transmit a mail message to a user of computer 120, lock a document associated with the violation (e.g., purchase order), or any other suitable action. Monitoring engine 224 may perform one or more actions in response to any suitable event. For example, monitoring engine 224 may automatically perform an action in response to updates to tracking tables 216. In some examples, monitoring engine 224 performs an action in response to a request received through GUI 203. In the event that the tracking tables 216 are subsequently updated, monitoring engine 224 may again compare the planned amounts and the confirmed amounts to regulation 118. If monitoring engine 224 determines that the amounts no longer violate regulation 118, then monitoring engine 224 may automatically perform an action such as releasing a locked document (e.g., purchase order).

Reporting engine 226 includes any suitable hardware, software, firmware, or combination thereof operable to generate reports 220 in response to any suitable event. For example, reporting engine 226 may receive a request to generate a report 220 for a particular substance via GUI 203 and generate report 220 for the substance in response to at least the request. In generating such report 220, the user may perform offline checks to verify that the planned amounts and the confirmed amounts do not violate regulations. In some embodiments, reporting engine 226 retrieves or otherwise identifies tracking data in tracking tables 216 based on selected parameters. The parameters may include period, regulation, material, tracked substances or any other suitable criteria. Reports 220 may include one or more of the following: warning icon (e.g., traffic light), regulatory list, year, material, plant, specification, tracked specification, date, amount, unit of amount, concentration of a tracked substance, concentration unit, company code, period, or other parameters. In addition to displaying report 220 through GUI 203, reporting engine 226 may also provide interactive elements such that the user may perform an action (e.g., custom buttons, menu exits) in response to the offline check. For example, reporting engine 226 may enable the user to block a document and, thus, block a business process.

Regardless of the particular implementation, "software" may include software, firmware, wired or programmed hardware, or any combination thereof as appropriate. Indeed, tracking engine 222, monitoring engine 224, and reporting engine 226 may be written or described in any appropriate computer language including C, C++, Java, J#, Visual Basic, assembler, Perl, any suitable version of 4GL, as well as others. It will be understood that while tracking engine 222, monitoring engine 224, and reporting engine 226 are illustrated in FIG. 2 as including individual modules, each of tracking engine 222, monitoring engine 224, and reporting engine 226 may include numerous other sub-modules or may instead be a single multi-tasked module that implements the various features and functionality through various objects, methods, or other processes. Further, while illustrated as internal to computer 120, one or more processes associated with tracking engine 222, monitoring engine 224, and/or reporting engine 226 may be stored, referenced, or executed remotely. For example, a portion of tracking engine 222 may be a web service that is remotely called, while another portion of tracking engine 222 may be an interface object bundled for processing at a remote client. Moreover, tracking engine 222, monitoring engine 224, and/or reporting engine 226 may be a child or sub-module of another software module or enterprise application (not illustrated) without departing from the scope of this disclosure.

In one aspect of operation, tracking engine 222 identifies planned amounts and/or confirmed amounts of a particular substance based, at least in part, on business documents. Tracking engine 222 may identify the planned and confirmed amounts in response to an event. For example, the event may be a request from a user, a period of time, update to tracking tables 216, or any other suitable event. After determining planned amounts and/or confirmed amounts of the particular substance, tracking engine 222 updates one or more tracking tables 216. In some embodiments, prior to updating tracking tables 216, tracking engine 222 aggregates the planned amounts and the confirmed amounts, and tracking engine 222 updates tracking tables 216 using the aggregated amounts. For example, tracking engine 222 identifies planned amounts of the particular substance using production business documents 208. In some embodiments, tracking engine 222 identifies planned amounts in accordance with associated criteria such as, for example, location, period, company, or other suitable criteria. After identifying the planned amounts, tracking engine 222 may combine or otherwise aggregate the identified planned amounts and update associated tracking tables 216 based, at least in part, on the aggregated planned amounts. Similarly, tracking engine 222 may identify confirmed amounts of the particular substance, aggregate the identified confirmed amounts, and update associated tracking tables 216 based, at least in part, on the aggregated confirmed amounts. Tracking engine 222 may perform the same processes on purchase business documents 210 and sales business documents 212.

After the associated tracking tables 216 are updated, monitoring engine 224 may determine whether the planned amounts and/or the confirmed amounts violate associated regulations 218. In some embodiments, monitoring engine 224 identifies criteria associated with the particular substance using regulations 218 and the planned amounts and/or confirmed amounts of the particular substance using tracking tables 216. Monitoring engine 224 may then compare the identified criteria with the identified planned amounts and/or the identified confirmed amounts to determine whether either or both amounts violate regulation 218. In response to determining a violation, monitoring engine 224 may perform one or more actions. For example, monitoring engine 224 may transmit a notification to a user of computer 120, lock a document associated with the substance to prevent or delay a business process (e.g., purchase order), display a notification through GUI 203, or perform other suitable actions. In one embodiment, monitoring engine 224 identifies the one or more actions using regulations 218.

In addition to automatically monitoring substances, reporting engine 226 may generate a report 220 in response to any suitable event. For example, reporting engine 226 may generate report 220 in response to a request by a user, expiration of a period of time, or other suitable events. In generating report 220, reporting engine 226 may identify one or more tracking tables 216 associated with a particular substance. Other critieria may be used to filter associated tracking tables 216 such as business process, plant, period, or others. Based, at least in part, on tracking tables 216, reporting engine 226 may generate report 220 and generate a presentation of the report through GUI 203 based, at least in part, on report 220. In addition to presenting a report, reporting engine 226 may present graphical elements through GUI 203 enabling the user to select actions for computer 120 to perform. For example, reporting engine 226 may receive a request from the user to block a document associated with a business process.

Figure 3:
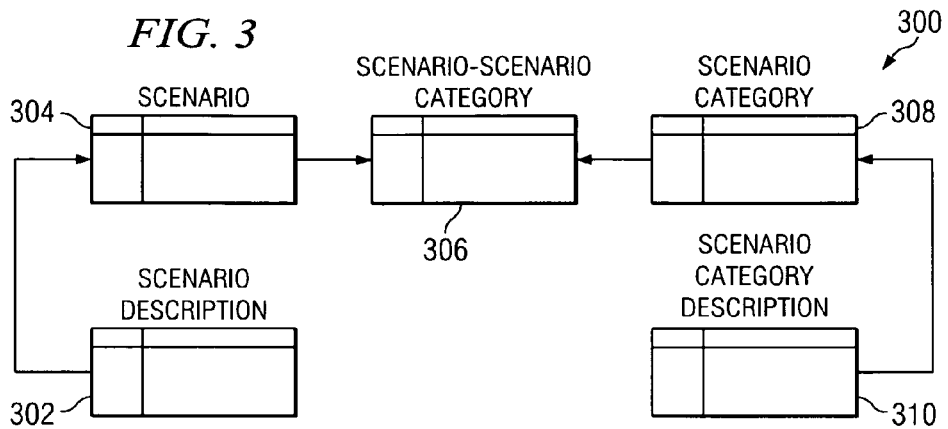
FIG. 3 illustrates a scenario system for providing tracking instructions in accordance with some embodiments of the present disclosure.

FIG. 3 illustrates a scenario system 300 for providing tracking instructions in accordance with one embodiment of the present invention. For example, system 300 may provide instructions or otherwise provide information that identifies instructions for determining tracking data for a given business process. In some embodiments, regulations 218 includes the data structure illustrated in system 300. In this case, tracking engine 222 may identify the tracking scenario in regulations 218 and process business documents in accordance with system 300. At a high level, system 300 includes scenario description 302, scenario 304, scenario categories 306 and 308, and scenario category description 310. However, system 300 is for illustration purposes only and may include some, none, or all of the elements without parting from the scope of this disclosure.

Scenario description 302 is operable to identify information associated with a business process identified by scenario 304. For example, scenario description 302 may identify a period, location, or other suitable information associated with a business process. As mentioned above, scenario 304 is operable to identify a tracking scenario for substances in a business process of system 100. For example, scenario 304 may include vendor 114 importing a particular substance amount. Scenario 304 may also assist in providing or otherwise identifying processes for determining tracking data within the identified scenario. For example, scenario 304 may define one or more of the following processes: how to determine relevant materials, how to determine relevant substances, how to get the constituents, how to condense tracking data, and how to save tracking data. In some embodiments, scenario 304 defines one or more of these processes in combination with one or more regulations 218. Scenario 304 may be associated with one or more scenario categories.

Scenario category description 310 is operable to identify information associated with a scenario category identified by scenario category 308. For example, scenario category description 310 may identify technical properties of the identified scenario category 308 enabling tracking engine 222 to receive tracking data. As mentioned above, scenario 304 may belong or otherwise be associated with one or more scenario categories. In the import example, scenario 304 may be associated with the following two scenario categories: purchase order and purchase requisition order. In the event that a user of computer 120 only wants to track purchase orders, the relationship link between scenario 304 and the appropriate scenario category may be removed. Scenario categories 306 and 308 may define or otherwise identify one or more of the following processes: how to read planned data, how to read confirmed data, how to fill tracking tables 216, and how to separate read data (e.g., special filters such as "purchase is an import"). In addition, scenario system 300 provides standard customizing such as illustrated in the table below.

| Scenario | Scenario description | Linked scenario category |
| --- | --- | --- |
| CON | Consumed amounts | Production |
| PRO | Produced amounts | Production |
| IMP | Imported amounts | Purchase |
| IMP | Imported amounts | Purchase requisition |
| EXP | Exported amounts | Sales |
| EXP | Exported amounts | Delivery |
| SO | Sold amounts | Sales |
| SO | Sold amounts | Delivery |

The customizable scenarios identified above are for illustration purposes only. Scenario system 300 may include the same, some, or different elements without departing from the scope of this disclosure.

Figure 4A:
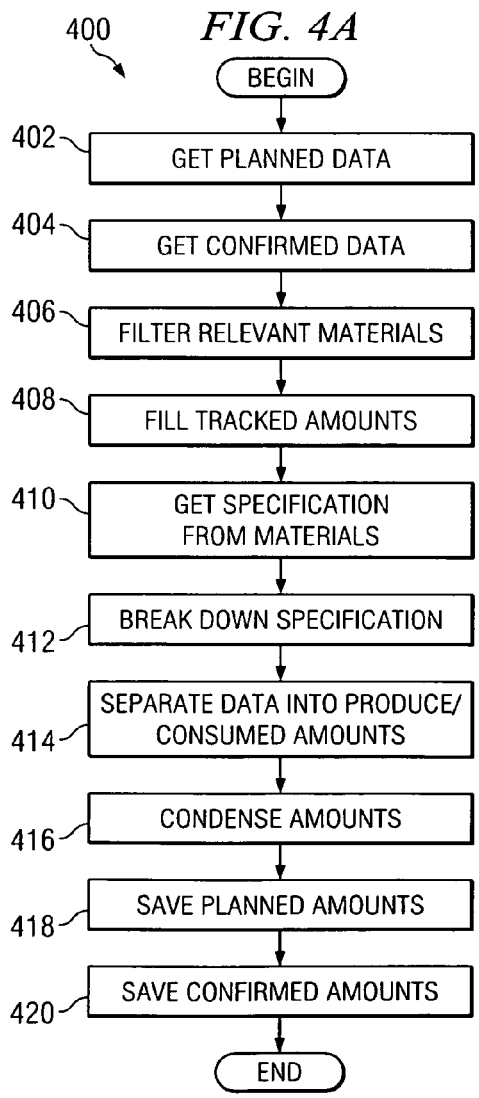
Figure 4B:
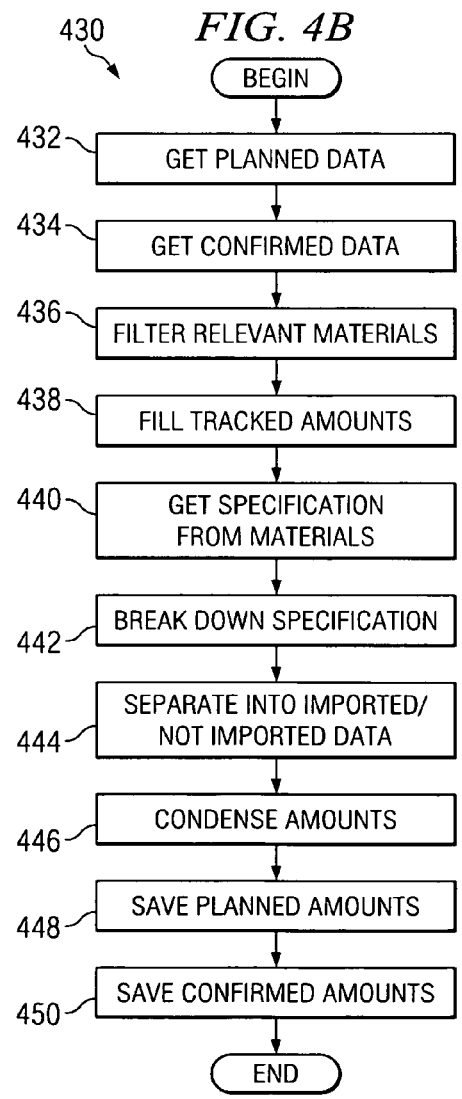

FIGS. 4A-C are flowcharts illustrating example methods 400, 430, and 460 for tracking substance volumes in accordance with one embodiment of the present disclosure. Generally, methods 400, 430, and 460 describe example techniques for tracking engine 222 to identify planned and confirmed substance volumes for certain business processes, determine aggregate planned amounts and confirmed amounts for each business process, and update associated tracking tables 216 based, at least in part, on the aggregated planned amounts and the aggregated confirmed amounts. The following descriptions will focus on the operation of tracking engine 222 in performing this method. But system 200 contemplates using any appropriate combination and arrangement of logical elements implementing some or all of the described functionality.

Referring to FIG. 4A, method 400 begins at step 402 where tracking engine 222 retrieves planned amounts of a material from production business documents 208. At step 404, tracking engine 222 retrieves confirmed amounts of the material from production business documents 208. Next, at step 406, tracking engine 222 filters the retrieved amounts to identify the relevant material amounts. As discussed above, the filters or other criteria may be, for example, a period, a plant, and/or other suitable criteria. After filtering for relevant materials, tracking engine 222 determines the relevant planned amounts and the relevant confirmed amounts at step 408. At step 410, tracking engine 222 retrieves or otherwise identifies a specification of the material indicating the constituent substances. Next, at step 412, tracking engine 222 determines the planned amounts and the confirmed amounts for each constituent substance. Tracking engine 222 then determines the produced amounts and the consumed amounts for both the planned amounts and the confirmed amounts for each tracked substance at step 414. Next, at step 416, tracking engine 222 condenses the produced amounts and the consumed amounts for each tracked substance. In some embodiments, the consumed amounts are subtracted from the produced amounts. At step 418, tracking engine 222 updates associated tracking tables 216 using the condensed planned amounts for each tracked substance. Similarly, at step 420, tracking engine 222 updates associated tracking tables 216 using the condensed confirmed amounts for each tracked substance.

Referring to FIG. 4B, method 430 begins at step 432 where tracking engine 222 retrieves planned amounts of a material from purchased business documents 210. At step 434, tracking engine 222 retrieves confirmed amounts of the material from purchased business documents 210. Next, at step 436, tracking engine 222 filters the retrieved amounts to identify the relevant material amounts. As discussed above, the filters or other criteria may be, for example, a period, a vendor, a location, and/or other suitable criteria. After filtering for relevant materials, tracking engine 222 determines the relevant planned amounts and the relevant confirmed amounts at step 438. At step 440, tracking engine 222 retrieves or otherwise identifies a specification of the material indicating the constituent substances. Next, at step 442, tracking engine 222 determines the planned amounts and the confirmed amounts for each constitutent substance. Tracking engine 222 then determines the imported amounts and the not imported amounts for both the planned amounts and the confirmed amounts for each tracked substance at step 444. Next, at step 446, tracking engine 222 condenses the imported amounts and the not imported amounts for each tracked substance. At step 448, tracking engine 222 updates associated tracking tables 216 using the condensed planned amounts for each tracked substance. Similarly, at step 450, tracking engine 222 updates associated tracking tables 216 using the condensed confirmed amounts for each tracked substance.

Referring to FIG. 4C, method 460 begins at step 462 where tracking engine 222 retrieves planned amounts of a material from sales business documents 212. At step 464, tracking engine 222 retrieves confirmed amounts of the material from sales business documents 212. Next, at step 466, tracking engine 222 filters the retrieved amounts to identify the relevant material amounts. As discussed above, the filters or other criteria may be, for example, a period, a customer, a location, and/or other suitable criteria. After filtering for relevant materials, tracking engine 222 determines the relevant planned amounts and the relevant confirmed amounts at step 468. At step 470, tracking engine 222 retrieves or otherwise identifies a specification of the material indicating the constituent substances. Next, at step 472, tracking engine 222 determines the planned amounts and the confirmed amounts for each constituent substance. Tracking engine 222 then determines the exported amounts and the not exported amounts for both the planned amounts and the confirmed amounts for each tracked substance at step 474. Next, at step 476, tracking engine 222 condenses the exported amounts and the not exported amounts for each tracked substance. At step 478, tracking engine 222 updates associated tracking tables 216 using the condensed planned amounts for each tracked substance. Similarly, at step 480, tracking engine 222 updates associated tracking tables 216 using the condensed confirmed amounts for each tracked substance.

FIGS. 5A-C are flowcharts illustrating example methods 500, 520, and 540 for monitoring substance volumes in accordance with one embodiment of the present disclosure. Generally, methods 500, 520, and 540 describe example techniques for monitoring engine 224 to monitor planned and confirmed substance volumes for certain business processes, determine whether the planned and/or confirmed amounts violate associated regulations, and execute an action in response to at least determining a violation of an associated regulation. The following descriptions will focus on the operation of monitoring engine 224 in performing this method. But system 100 contemplates using any appropriate combination and arrangement of logical elements implementing some or all of the described functionality.

Referring to FIG. 5A, method 500 begins at decisional step 502 where monitoring engine 224 determines if tracking tables 216 include tracking data for a particular substance. If tracking tables 216 do not include the particular tracking data, then execution ends. If tracking tables 216 include tracking data for the particular substance, then execution proceeds to decisional step 504. If the retrieved tracking data is not relevant at decisional step 504, then execution ends. As discussed above, relevancy of the tracking data can be determined based on any appropriate criteria. For example, the criteria may be a period, a business process, a location, or other suitable criteria. If the retrieved tracking data is relevant, then monitoring engine 224 identifies the planned amounts and the confirmed amounts based on any suitable criteria such as, for example, company code level. If the amounts are within specified limits at decisional step 508, then execution hands. As discussed above, the limits may be based on a regulation limit, special limit, a limit specified by a user of computer 120, or any other suitable limit. If one or more of the amounts violate one or more specified limits at decisional step 508, then monitoring engine 224 automatically executes an action. Actions may include displaying a message via GUI 203, transmitting a message to a specified individual, blocking the release of document (e.g., purchase order, production order), and/or other suitable actions.

Referring to FIG. 5B, method 520 begins at step 522 where monitoring engine 224 aggregates planned amounts and confirmed amounts of a particular substance. If the aggregated amounts do not exceed associated limits at decisional step 524, then execution ends. As mentioned above, the associated limits may include or otherwise be based on government regulations, company regulations, or other suitable sources. If the aggregated amounts exceed at least one of the associated limits at decisional step 524, then monitoring engine 224 generates and displays graphical elements to indicate the violation at step 526.

Referring to FIG. 5C, method 542 begins at step 542 where monitoring engine 224 identifies a current amount in tracking tables 216 for a particular substance. If the particular substance does not have associated registered limits at decisional step 544, then execution proceeds to decisional step 546. If the amounts of the particular substance do not violate general limits at decisional step 546, then execution ends. If the amounts of the particular substance do violate general limits, then execution proceeds to step 554. Returning to decisional step 544, if the particular substance does have associated registered limits, then execution proceeds to decisional step 548. If the particular substance has associated specific limits, then execution proceeds to decisional step 550. If the tracking amounts of the particular substance do not violate the associated specific limits, then execution ends. If the tracking amounts of the particular substance violate the specific limits, then execution proceeds to step 554. Returning to decisional step 548, if specific limits of the particular substance do not exist, then execution proceeds to decisional step 552. If the identified tracking amounts do not match relative limits, then execution ends. If the identified tracking amounts violate relative limits at decisional step 552, then monitoring engine 224 executes an action in response to at least the violation. For example, monitoring engine 224 or may display a warning through GUI 203, block an associated business document, generate an icon, and/or perform other suitable actions.

Figure 6A:
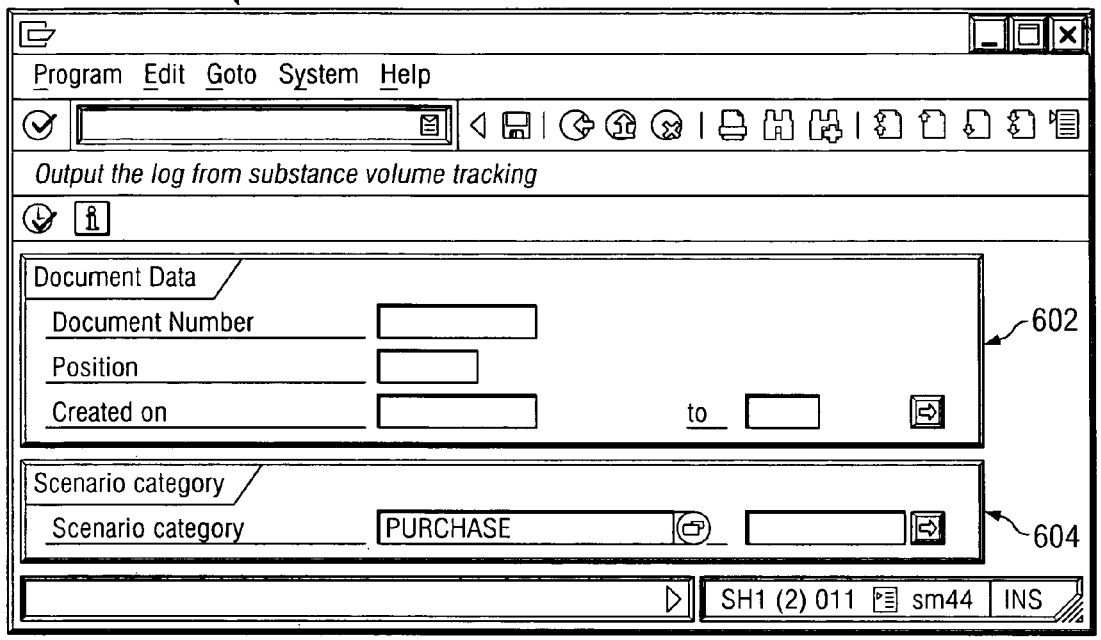
FIGS. 6A-B are example displays for monitoring substance amounts by the tracking system of FIG. 2 in accordance with some embodiments.
Figure 6B:
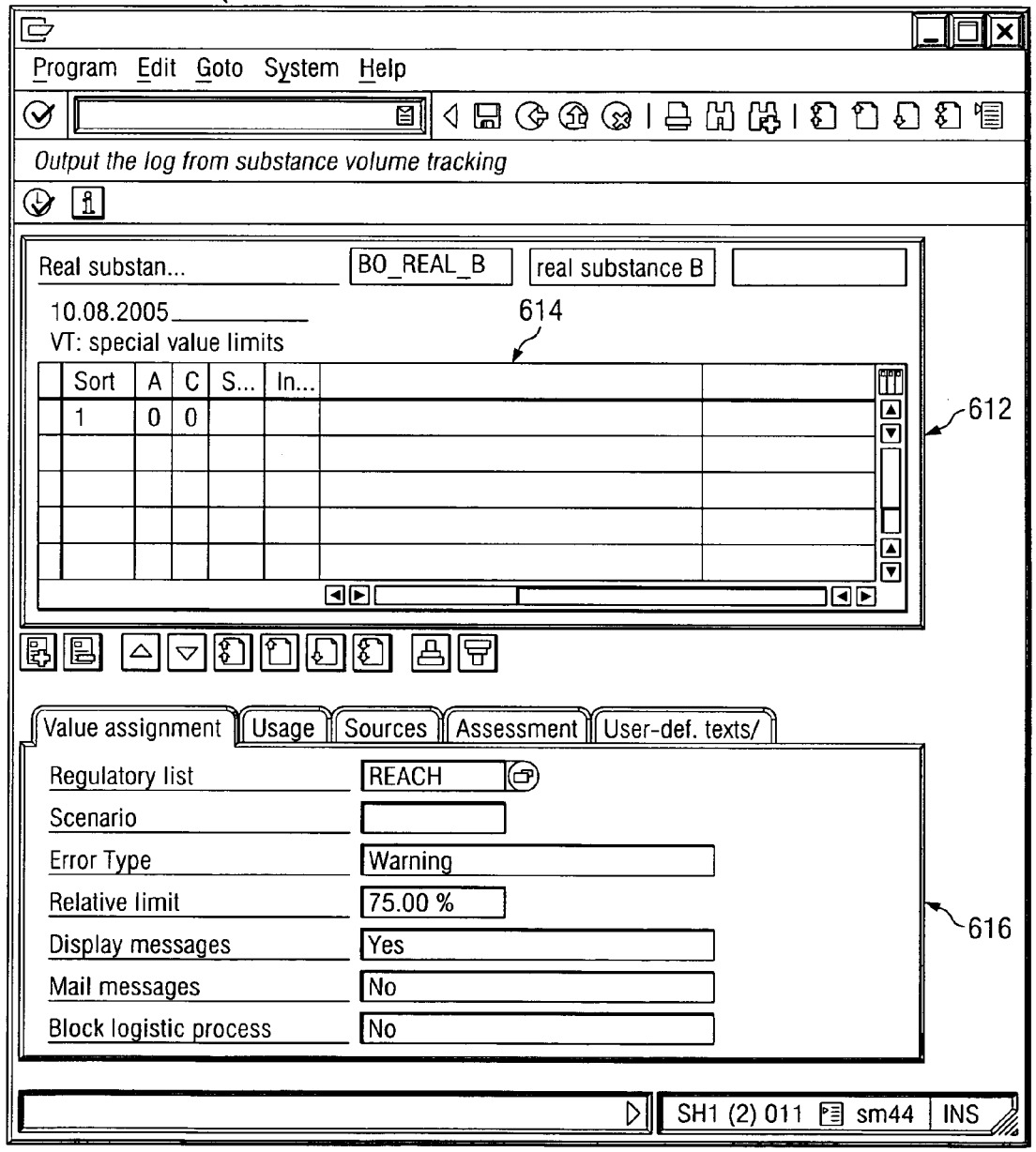

FIGS. 6A-B are example displays 600 and 610, respectively, for monitoring substance amounts by computer 120 in accordance with one embodiment of system 100. It will be understood that the illustrated pages are for example purposes only. Accordingly, GUI 203 may include or present data, such as substance amounts and associated information, in any format or descriptive language and each page may present any appropriate data in any layout without departing from the scope of the disclosure.

Turning to the illustrated embodiments, FIG. 6A illustrates a display 600 for providing information associated with a transaction. In this display 600, the user may examine information associated with a particular business process. For example, display 600 may present information associated with the purchase of a substance on a particular day. In the illustrated embodiment, display 600 includes document data view 602 and scenario category view 604. Document data view 602 may display information associated with a document including transaction information. For example, document data view 602 may present information associated with a business document, such as, for example, production business documents 208, purchase business documents 210, and sales business documents 212. In the illustrated embodiments, document data view 602 includes fields for displaying the following information associated with a document identifying a transaction: document number, position, and created on. Document data view 602 may include other information to assist the user in identifying the document associated with a particular transaction. Scenario category view 604 may include information associated with the scenario category of a business process. For example, scenario category view 604 may identify the scenario category of a business process. In the illustrated embodiment, scenario category view 604 includes a field that identifies the scenario category of a business process (e.g., purchase).

Referring to FIG. 6B, display 610 presents information associated with value limit checks in accordance with one embodiment of the present disclosure. As discussed above, monitoring engine 224 may perform value limit checks on the following three types of value limits: general value limits, relative value limits, and substance value limits. Monitoring engine 224 may perform some, all, or different value limit checks or monitor other suitable parameters of a particular substance. Each of the value limits may include or otherwise identify one or more of the following: regulatory list, registration level (e.g., 1. level:<ton, 2. level: 1-10 tons, 3. level: 10-100 tons), scenario, lower limit, upper limit, relative limit, flag display message, flag mail message, or flag block message. In the illustrated embodiment, display 610 presents information associated with special value limits. Display 610 includes limit display 612 and value display 616. Limit display 612 identifies a particular substance and the special value limit associate with the substance. In some embodiments, limit display 612 includes limit table 614 for displaying information associated with the limits. In the event that the particular substance is associated with a plurality of limits, the user may select a limit in limit table 614 and then value display 616 may be populated with appropriate values. Value display 616 displays information associated with limits of the particular substance. In the illustrated embodiment, value display 616 includes the following tabs: value assignment, usage, sources, assessment, and user-defined texts. A user may then view information associated with the different tabs by selecting the appropriate tab. As illustrated, the value-assignment tab is selected and, thus, value display 616 displays information associated with value assignment. As mentioned above, limits include associated parameters. The user may view and/or modify the value of these parameters through value display 616. In the illustrated embodiment, value display 616 present values for the following parameters: regulatory list, scenario, error type, relative limit, display message, mail message, and block logistic process. These parameters are for illustration purposes only and may include some, all, or different parameters without departing from the scope of this disclosure.

FIGS. 7A-G are example displays for automatically monitoring substance in business processes. As mentioned above, monitoring engine 224 may suspend and/or allow the business process by blocking and/or releasing associated business documents. For example, business documents may include production documents (e.g., production order, process order), purchase requisition, purchase documents (e.g., scheduling agreement, purchase order), sales documents (e.g., orders, scheduling agreement, contract), and delivery documents. It will be understood that the illustrated pages are for example purposes only. Accordingly, GUI 203 may include or present data in any format or descriptive language and each page may present any appropriate data in any layout without departing from the scope of the disclosure.

Figure 7C:
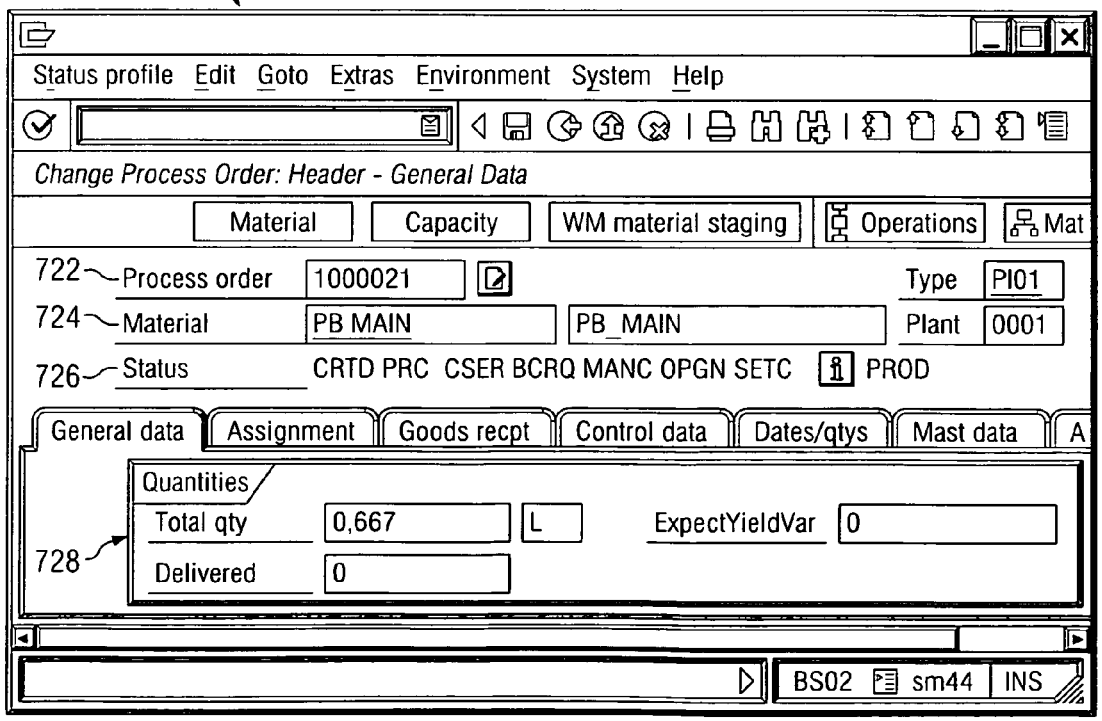
Figure 7A:
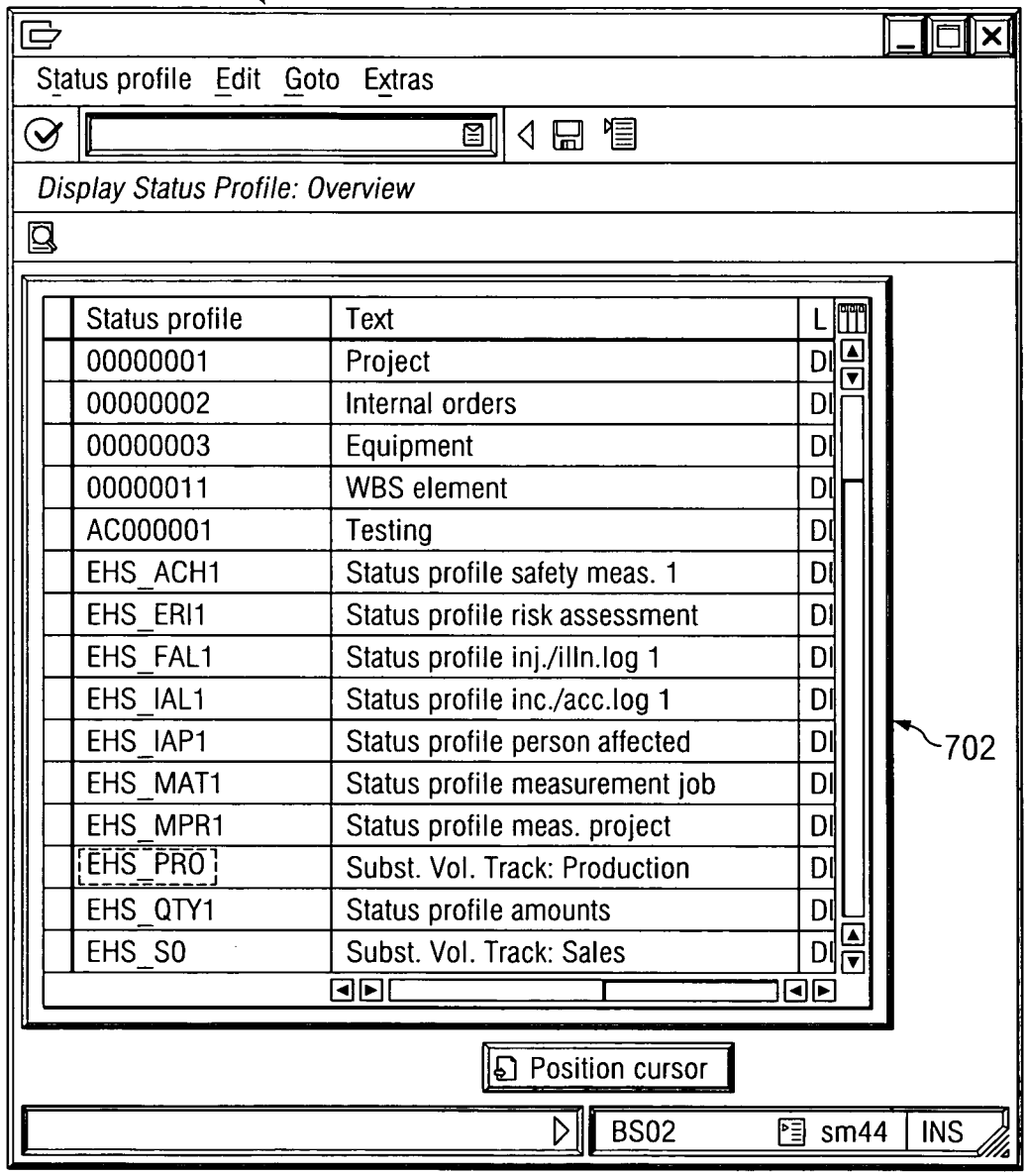

Referring to FIG. 7A, display 700 illustrates an overview of a display status profile. In the illustrated embodiment, display 700 includes the status table 702 that includes a number of rows and a number of columns. The intersection of a row and column form a cell that contains information. Status table 702 includes at least two columns: Status profile and Text. In this embodiment, the text provides a brief description of the status profile. A user may select a status profile to view and/or update associated information. For example, the user may select EHS_PRO to view substance volume tracking information in production as indicated by the dashed box.

Figure 7B:
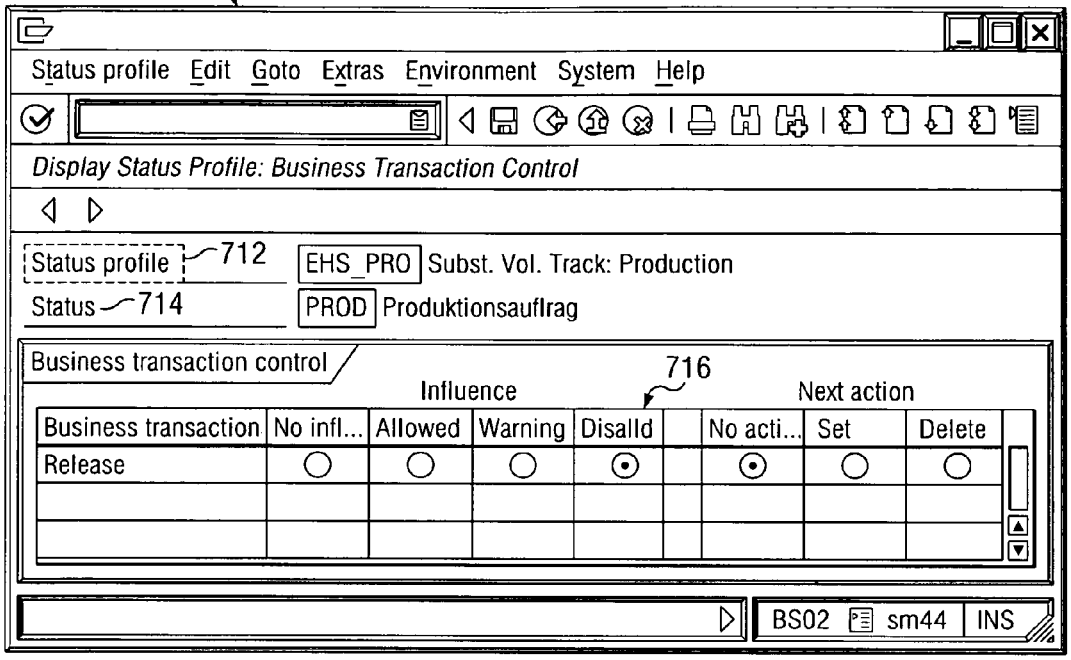

Referring to FIG. 7B, monitoring engine 224 may present display 710 in response to a selection in display 700. In the illustrated embodiment, monitoring engine 224 presents transaction controls associated with the selected status profile. Display 710 includes a status profile field 712, a status field 714, and a business control table 716. Display 710 is for illustration purposes only and may include some, all, or different elements. Status profile field 712 indicates the status profile associated with the display. As illustrated, the status profile is EHS_PROD, which is tracking substance volumes in production. Business control table 716 displays actions that monitoring engine 224 may perform in response to a limit violation. In particular, control table 716 identifies a graphical element associated with actions that monitoring engine 224 may perform. As illustrated, the actions are as follows: no influence, allowed, warning, and disabled. As indicated by display 710, the release order of a produced product is disabled in the event of a violation. Control table 716 includes additional graphical elements associated with additional actions that monitoring engine 224 may perform.

Referring to FIG. 7C, monitoring engine 224 may present information associated with a process order as illustrated in display 720. For example, monitoring engine 224 may retrieve information associated with a process order from tracking tables 216 and populate display 720 with the associated information. In the illustrated embodiment, display 720 includes a process order field 722, a material field 724, and a status field 726. Process order field 722 indicates the order number associated with the business process. The material field 724 indicates the material produced in the business process. The user may view additional information through order display 728. As illustrated, order display 728 includes tabs indicating different types of data that the user may view. The illustrated tabs are general data, assignment, goods receipt, control data, dates/qtys, master data, and others. The general data is selected in order display 728 and indicates the quantity of the material that will be produced.

Referring to FIG. 7D, processor 206 presents information associated with purchase requisition in display 730. Monitoring engine 224 may retrieve the information from tracking tables 216. In some embodiments, tracking engine 222 retrieves the information from sales business documents 212 and presents the information through display 730. Display 730 includes a production order field 732, a materials' table 734, and a material information view 736. In some embodiments, production order field 732 identifies a production order number. Materials table 734 identifies materials included in the purchase requisition, as well as displays associated information. Materials table 734 includes columns and rows whose intersection forms a cell. The cell may display information associated with the material. In the illustrated embodiment, materials table 734 includes the following columns: status, item, material name, short text, quantity, unit, delivery date, plant, and storage location. The user may view additional information associated with a material listed in materials table 734 by selecting the material. In response to at least a selection in materials table 734, tracking engine 222 may populate material information view 736 with information associated with the selected material. In the illustrated embodiment, material information view 736 includes the following eight tabs: material data, quantities/dates, valuation, source of supply, status, contact person, texts, and delivery address. The user may view information associated with the tab by selecting the tab. As illustrated, the delivery address tab is selected so, in this example, material information view 736 presents the delivery address of the material selected in materials table 734.

Figure 7E:
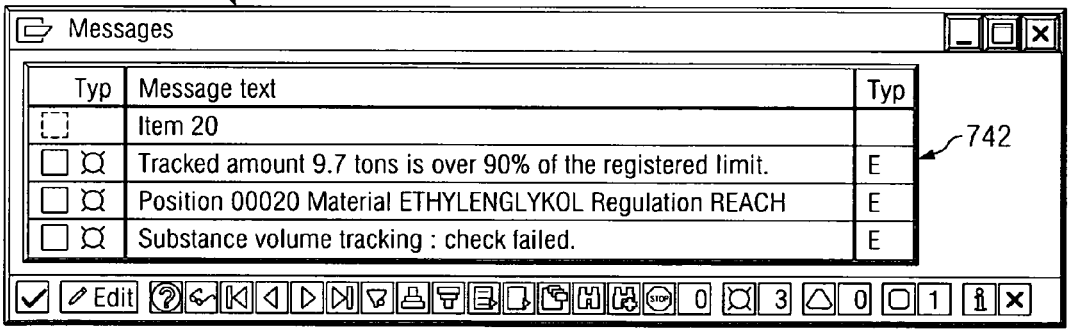

Referring to FIG. 7E, monitoring engine 224 may present the message 740 in response to a tracked substance violating a limit. Message 740 includes message table 742. Message table 742 includes two columns labeled: Typ and Message Text. Message table 742 conveys information associated with monitoring criteria for the substance.

Figure 7G:
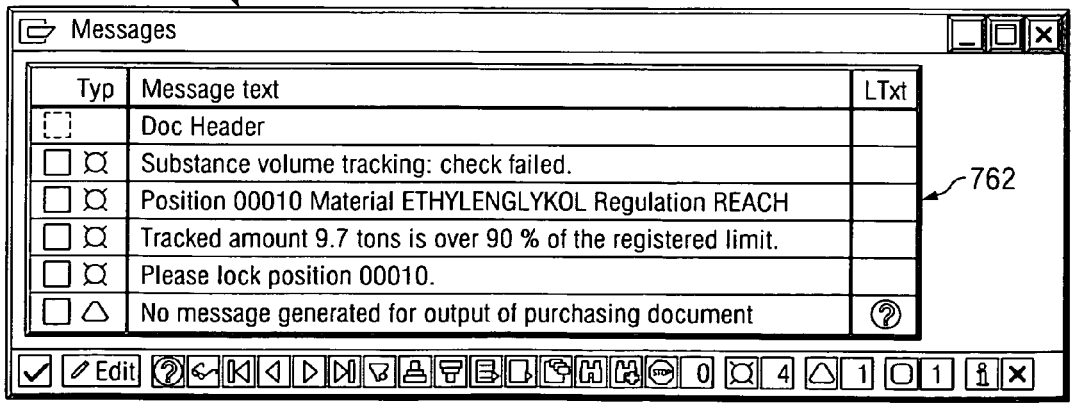
Figure 7D:
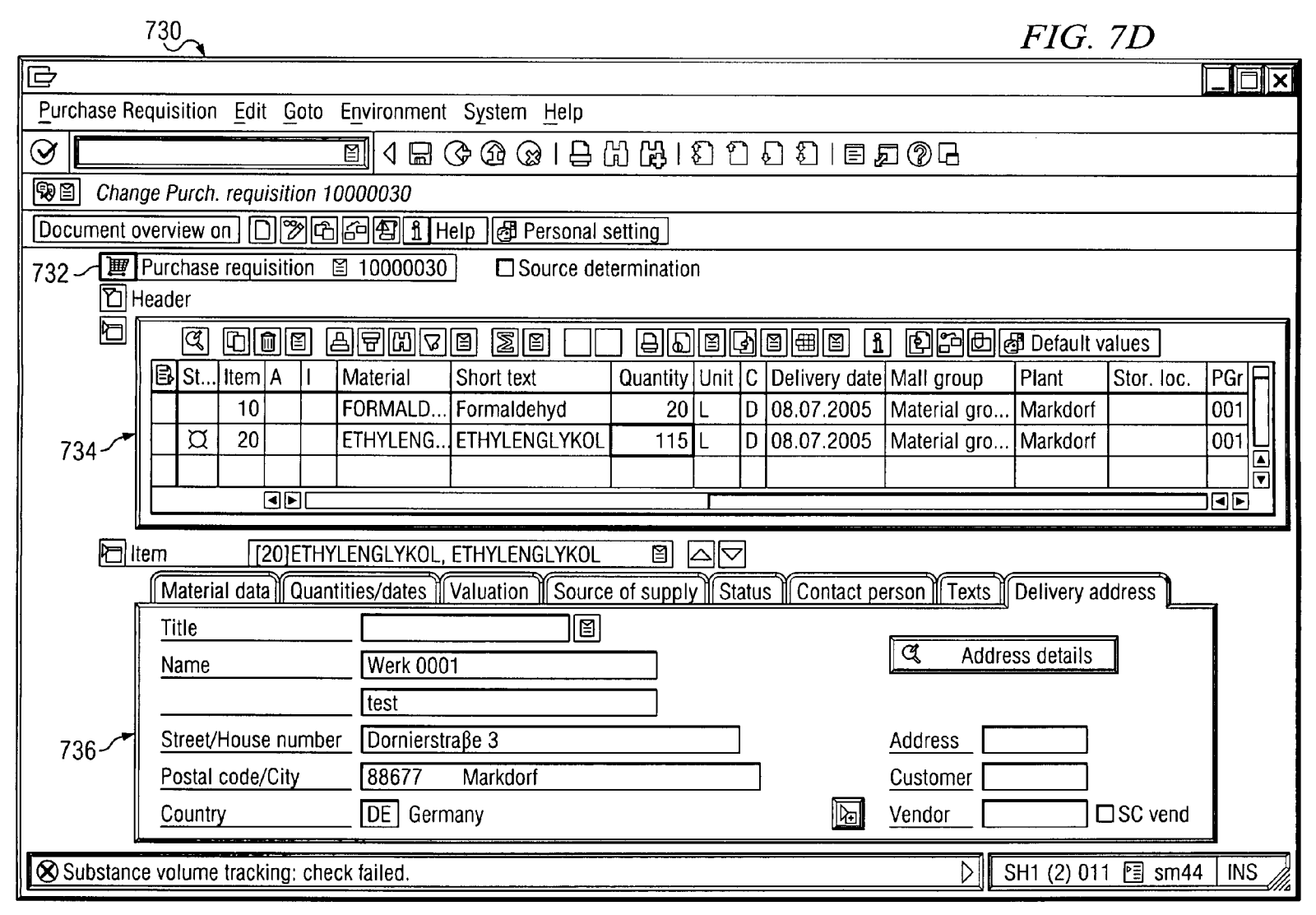
Figure 7F:
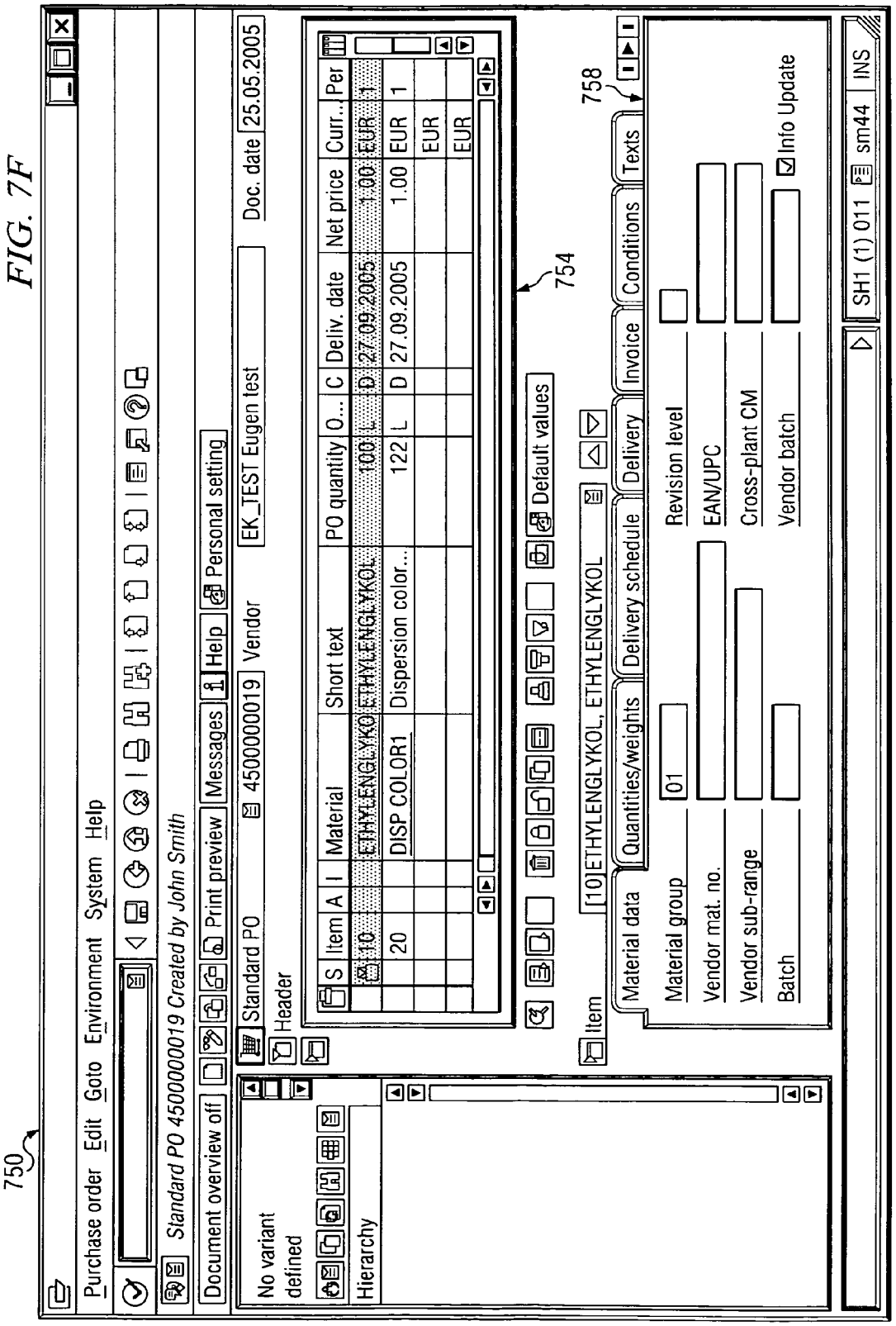

Referring to FIG. 7F, processor 206 presents information associated with a purchase order in display 750. Monitoring engine 224 may retrieve the information from tracking tables 216. In some embodiments, tracking engine 222 retrieves the information from purchase business documents 210 and presents the information through display 750. Display 750 includes a production a materials table 754 and a material information view 758. Materials table 754 identifies materials included in the purchase order, as well as displays associated information. Materials table 754 includes columns and rows whose intersection forms a cell. The cell may display information associated with a material. In the illustrated embodiment, materials table 754 includes the following columns: status, item, material name, short text, PO quantity, delivery date, net price, and currency. The user may view additional information associated with a material listed in materials table 754 by selecting one of the displayed materials. In response to at least a selection in table 754, tracking engine 222 may populate material information view 758 with information associated with the selected material. For example, tracking engine 222 may retrieve information from associated purchase business documents 210 In the illustrated embodiment, material information view 758 includes the following eight tabs: material data, quantities/weights, delivery schedule, delivery, invoice, conditions, and texts. The user may view information associated with tab title by selecting the tab. As illustrated, the material-data tab is selected so, in this example, material information view 758 presents the material data of the material selected in materials table 754.

Referring to FIG. 7G, monitoring engine 224 may present the message 760 in response to a tracked substance violating a limit. Message 760 includes message table 762. Message table 762 includes two columns labeled: Typ and Message Text. Message table 762 conveys information associated with monitoring criteria for the substance.

Figure 8:
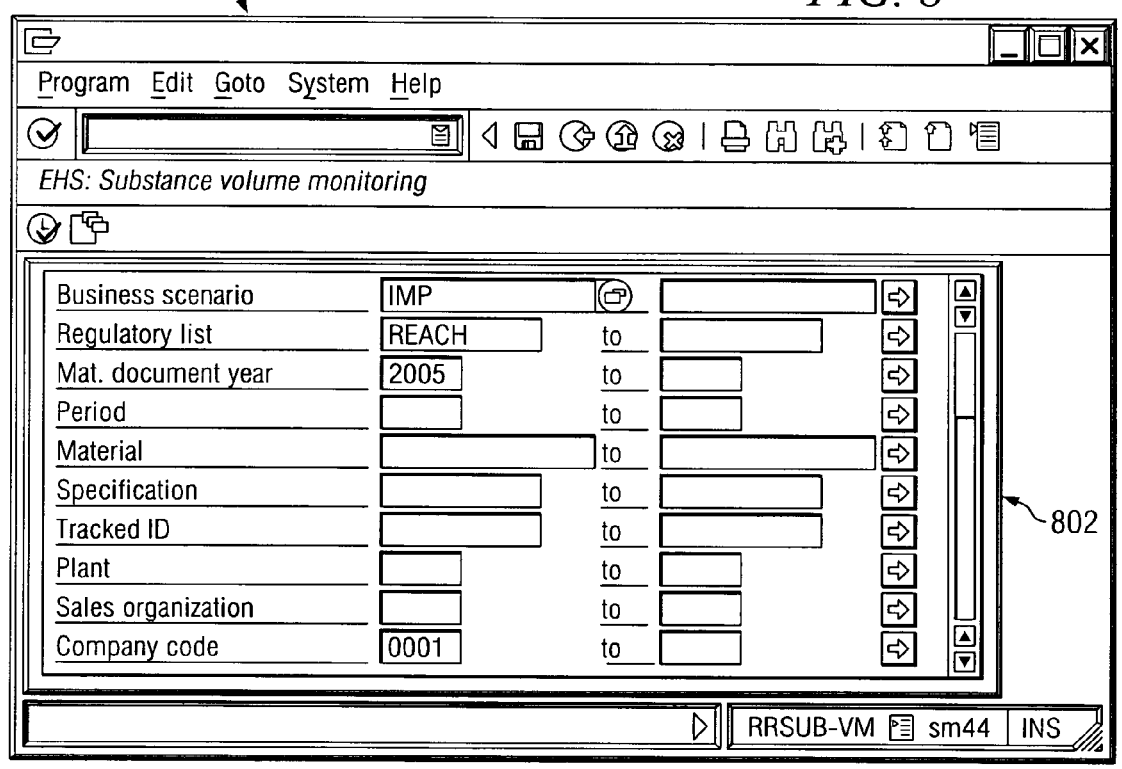
FIG. 8 is an example display for monitoring substance in business processes.

FIG. 8 is an example display 800 for monitoring substance in business processes. As mentioned above, monitoring engine 224 may monitor substances in business processes based on suitable parameters or criteria. For example, example monitoring engine 224 may monitor a substance based on a period, a plant, a company code, or other suitable criteria. It will be understood that the illustrated page is for example purposes only. Accordingly, GUI 203 may include or present data in any format or descriptive language and each page may present any appropriate data in any layout without departing from the scope of the disclosure. Display 800 includes a parameter view 802 for presenting and/or receiving updates of parameters associated with monitoring a substance. In the illustrated embodiment, parameter view includes the following fields: business scenario, regulatory list, material document year, period, material, specification, tracked ID, plant, sales organization, and company code. It will be understood that these parameters are for illustration purposes only. Parameter view 802 may include some, none, or all of the illustrated parameter fields without departing from the scope of this disclosure.

FIGS. 9A-C are flowcharts illustrating example methods 900, 928, and 950 for monitoring substance volumes and associated business documents in accordance with one embodiment of the present disclosure. Generally, methods 900, 928, and 950 describe example techniques for monitoring engine 224 to monitor business documents for certain business process, determine whether the planned and/or confirmed amounts violate associated regulations, and execute an action in response to at least determining a violation of an associated regulation. The following descriptions will focus on the operation of monitoring engine 224 in performing this method. But system 100 contemplates using any appropriate combination and arrangement of logical elements implementing some or all of the described functionality.

Referring to FIG. 9A, method 900 focuses on the operation of the buyer 116 during the purchasing of materials. Method 900 begins at step 902 where plan requirements are received. In response to at least receiving the plan requirements, computer 120 generates a purchase order at step 904. If the planned amount violates a threshold at decisional step 906, then, at step 908, the purchase order is loaded. If the planned amount does not violate a threshold, then, at step 908, monitoring engine 224 releases the purchase order. If the goods received is not confirmed that decisional step 912, then monitoring engine 224 transmits a notification that the amount is unconfirmed at step 914. If the goods received is confirmed, then, at step 916, monitoring engine 224 updates confirmed amount and tracking table 216. At step 918, an invoice is received. If the invoices is not verified at decisional step 920, then monitoring engine 224 locks the invoice at step 922. If the invoice is verified, then, at step 924, monitoring engine 224 releases the invoice. In response to at least the released invoice, a check is generated in payment and is released at step 926.

Referring to FIG. 9B, method 928 focuses on the operation of monitoring engine 224 during the purchasing of materials. Method 928 begins at step 930 where a purchase orders is received. Next, at step 932, monitoring engine 224 identifies an associated threshold based, at least in part, on regulations 218. If the claimed amount violates a threshold at step 934, then monitoring engine 224 transmits a notification of the violation at step 936. If the planned amount does not violate the associated threshold, then, at step 938, monitoring engine 224 updates the planned amount and tracking tables 216. At step 940, confirmation of updated confirmed amount is received. In response to at least the confirmation, confirmed amount is updated in tracking tables 216 at step 942.

Referring to FIG. 9C, method 950 focuses on the operation of vendor 114 during the purchasing of materials. Method 950 begins at step 952 to where computer 120 receives a purchase order. Next, at step 954, computer 120 generates a sales order in response to at least the received purchase order. If the sales order is not validated a decisional step 956, then, at step 958, monitoring engine 224 transmits a notification that the sales order is not validated. If the sales order is validated a decisional step 956, then, at step 960, monitoring engine 224 generates an advanced shipping notification. Monitoring engine 224 transmits the advanced shipping notification to the recipient of the purchased goods at step 962. At step 964, computer 120 receives an indication that the goods receipt is confirmed. In response to at least the indication, computer 120 generates an invoice at step 966. Computer 120 transmits the invoice to the recipient of the goods at step 968.

FIGS. 10A-D are flowcharts illustrating example methods 1000, 1020, 1050, and 1080 for monitoring substance volumes during production in accordance with one embodiment of the present disclosure. Generally, methods 1000, 1020, 1050, and 1080 describe example techniques for monitoring engine 224 to monitor production business documents 208, determine whether the planned and/or confirmed amounts violate associated regulations, and execute an action in response to at least determining a violation of an associated regulation. The following descriptions will focus on the operation of a customer, sales and distribution of manufacturer, monitoring engine 224, and manufacturing in performing these methods. But system 100 contemplates using any appropriate combination and arrangement of logical elements implementing some or all of the described functionality.

Referring to FIG. 10A, method 1000 focuses on the operation of a buyer during the production of a requested material. Method 1000 begins at step 1002 where buyer 116 initiates a requirement to manufacturer 110. If buyer 116 does not receive a sales order based, at least in part, on the initiated requirement at decisional step 1004, then execution ends. If buyer 116 receives a sales order, then, at step 1006, buyer 116 generates a purchase order. Next, at step 1008, buyer 116 transmits the purchase order to manufacturer 110.

Referring to FIG. 10B, method 1020 focuses on the operation of sales and distribution of manufacturer 110 during the production of the requested material. Method 1020 begins at step 1022, where manufacturer 110 receives a request from buyer 116. In response to at least the request, manufacturer 110 generates a sales order at step 1024. If notification status is not verified at decisional step 1026, then execution ends. If notification status is verified at decisional step 1026, then, at step 1028, manufacturer 110 transmits the sales order to buyer 116. If manufacturer 110 determines that the requested amount is not available at decisional step 1030, then execution ends. If manufacturer 110 determines that the amount is currently available and/or may be manufactured at decisional step 1030, then execution proceeds to decisional step 1032. If the amount is not available within the date specified by buyer 116, then execution ends. If the material will be available within the date specified by buyer 116 then, at step 1034, manufacturer 110 generates a production order.

Referring to FIG. 10C, method 1050 focuses on the operation of tracking engine 222 and monitoring engine 224. Method 1050 begins at step 1052 where tracking engine 222 receives a sales order from manufacturer 110. At step 1054, tracking engine 222 determines a notification status based, at least in part, on the sales order. Tracking engine 222 transmits the status to manufacturer 110 at step 1056. At step 1058, tracking engine 222 receives production order and stores relevant information in tracking tables 216. If monitoring engine 224 determines that the amount in the production order violates one or more limits associated with the ordered material at decisional step 1060, then, a step 1062, monitoring engine 224 transmits a notification of the violation to manufacturer 110. If monitoring engine 224 determines that the amount in the production order does not violate limits associated with the ordered material at decisional step 1060, then, a step 1064, tracking engine 222 updates the planned amounts in tracking tables 216. At step 1066, tracking engine 222 receives goods receipt that confirms buyer 116 received the ordered material. In response to at least the goods receipt, tracking engine 222 updates confirmed amounts of the material in tracking tables 216.

Referring to FIG. 10D, method 1080 focuses on the operation of manufacturing of the ordered material. Method 1080 begins at step 1082 where manufacturer 110 receives a production order. Next, at step 1084, manufacturer 110 stages raw materials needed for manufacturing the ordered material. After staging the raw materials, manufacturer 110 produces the order material at step 1086. At step 1088, manufacturer 110 confirms the goods received. Manufacturer 110 transmits the confirmed amounts to tracking engine 222 at step 1090.

FIGS. 11A-C are flowcharts illustrating example methods 1100, 1120, and 1140 for monitoring substance volumes during production for stock. For example, the substance may be stocked at vendor 114 and/or distributor 112. Generally, methods 1100, 1120, and 1140 describe example techniques for monitoring engine 224 to monitor production business documents 208, determine whether the planned and/or confirmed amounts violate associated regulations, and execute an action in response to at least determining a violation of an associated regulation. The following descriptions will focus on the operation of a planner such as distributor 112, monitoring engine 224, and manufacturer 110. But system 100 contemplates using any appropriate combination and arrangement of logical elements implementing some or all of the described functionality.

Referring to FIG. 11A, method 1100 focuses on the operation of distributor 112 of a particular substance. Method 1100 begins at step 1102 where distributor 112 generates a forecast of the demand of a particular material. In response to at least the forecast demand, distributor 112 determines material planning in an attempt to satisfy the forecast demand at step 1104. Next, at step 1106, distributor 112 generates a process order based, at least in part, on the material planning. If distributor 112 receives an indication that the process order is not within associated limits at decisional step 1108, then, at step 1110, the process order is locked. If the distributor 112 receives an indication that the process order is within associated limits at decisional step 1108, then, at step 1112, distributor 112 releases the process order to manufacturer 110.

Referring to FIG. 11B, method 1120 focuses on the operation of tracking system 200. Method 1120 begins at step 1122 where monitoring engine 224 receives a process order identifying requested material. If the requested material violates limits of associated regulations at decisional step 1124, then execution proceeds to step 1128. If the request material does not violate limits of associated regulations at decisional step 1124, then, at step 1126, monitoring engine 224 updates planned amounts in tracking tables 216. At step 1128, monitoring engine 224 transmits a notification of the status of the process order.

Referring to FIG. 11C, method 1140 focuses on the operation of manufacturer 110. Method of 1140 begins at step 1142 where manufacturer 110 can receive the process order from distributor 112. In response to at least the process order, manufacturer 110 stages raw material for the production of the ordered material at step 1144. After staging the raw material, manufacturer 110 can produce the ordered material at step 1146. If manufacturer 110 does not confirm goods receipt at step 1148, then execution ends. If manufacturer 110 does confirm goods receipt at decisional step 1148, then manufacturer 110 transmits updated confirmed amounts to tracking engine 222 at step 1150.

Figure 12A:
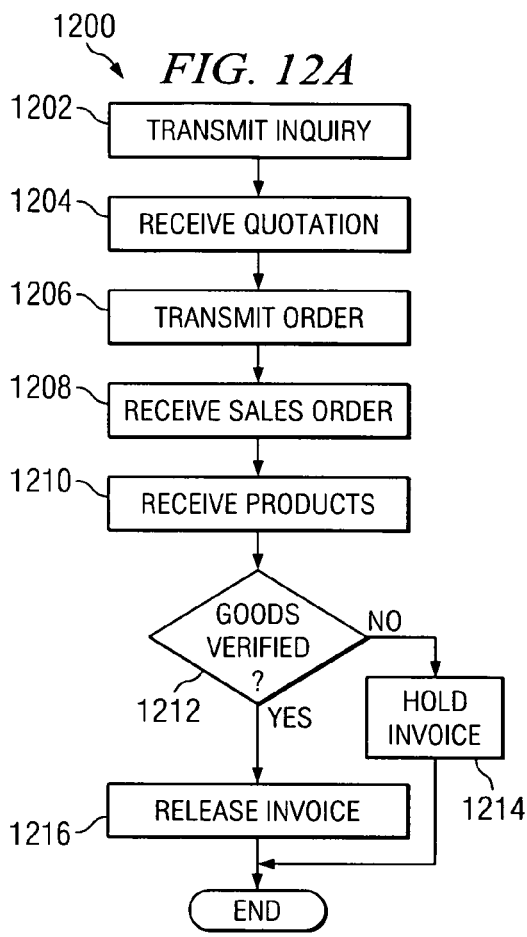
Figure 12B:
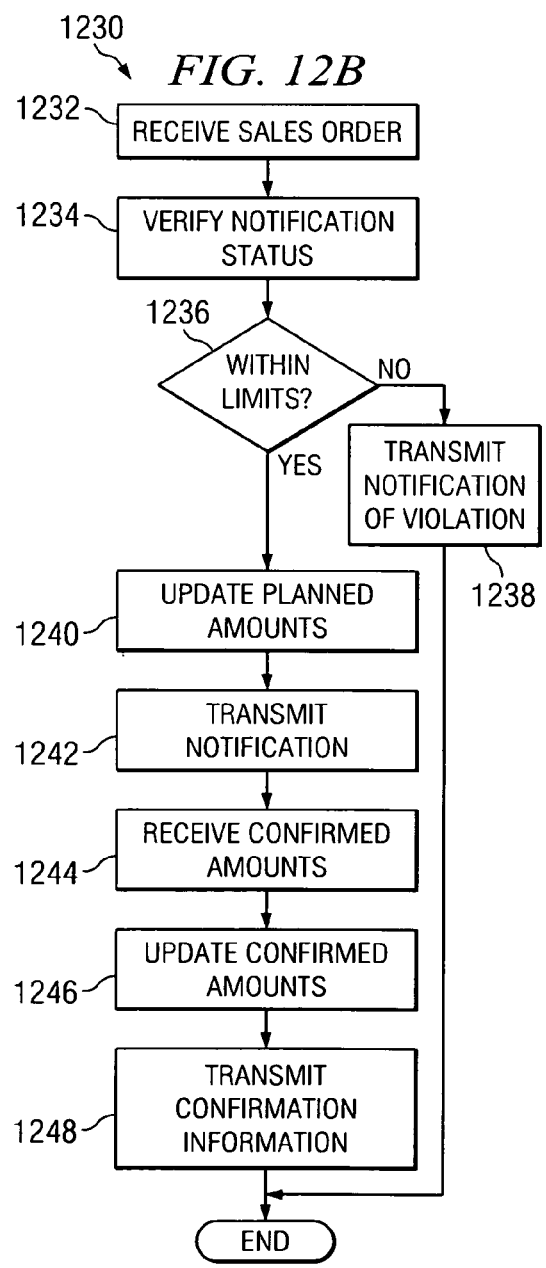

FIGS. 12A-C are flowcharts illustrating example methods 1200, 1230, and 1260 for monitoring substance volumes during sales and shipping material. Generally, methods 1200, 1230, and 1260 describe example techniques for monitoring engine 224 to monitor sales business documents 212, determine whether the planned and/or confirmed amounts violate associated regulations, and execute an action in response to at least determining a violation of an associated regulation. The following descriptions will focus on the operation of buyer 116, monitoring engine 224, and vendor 114. But system 100 contemplates using any appropriate combination and arrangement of logical elements implementing some or all of the described functionality.

Referring to FIG. 12A, method 1200 focuses on the operation of buyer 116. Method 1200 begins at step 1202 where buyer 116 transmits a purchase inquiry to vendor 114. In response to the inquiry, buyer 116 receives a quotation of the request material at step 1204. Buyer 116 transmits a purchase order to vendor 114 based, at least in part, on the received quotation at step 1206. At step 1210, buyer 116 receives the requested materials. If buyer 116 is unable to verify the received materials at decisional step 1212, then, at step 1214, buyer 116 holds the associated invoice. If buyer 116 verifies the received materials at decisional step 1212, then, at step 1216, buyer 116 releases the invoice to vendor 114.

Referring to FIG. 12B, method 1230 focuses on the operation of monitoring engine 224. Method 1230 begins at step 1232 where monitoring engine 224 receives information associated with a sales order for the material. Monitoring engine 224 verifies notification status of the order at step 1234. If monitoring engine 224 determines that the order violates limits of an associated regulation at decisional step 1236, then, at step 1238, monitoring engine 224 transmits a notification of the violation to vendor 114 and/or buyer 116. If monitoring engine 224 determines that the order does not violate limits of an associated regulation at decisional step 1236, then, at step 1240, monitoring engine 224 updates planned amounts in tracking tables 216. Monitoring engine 224 transmits a notification that the order does not violate regulations to vendor 114 at step 1242. At step 1244, monitoring engine 224 receives confirmed amounts of the substance. Based, at least in part, on the received confirmed amounts, monitoring engine 224 updates confirmed amounts in tracking tables 216. Monitoring engine 224 transmits information confirming the amounts being shipped to buyer 116 at step 1248.

Referring to FIG. 12C, method 1260 focuses on the operation of vendor 114 for the sale and shipping of a requested material. Method 1260 begins at step 1262 wherein vendor 114 receives an inquiry for a material from buyer 116. In response to at least the inquiry, vendor 114 transmits a quotation for the requested material to buyer 116 at step 1264. At step 1266, vendor 114 receives an acceptance of the quotation from buyer 116. Vendor 114 generates a sales order at step 1268 based, at least in part, on the transmitted quotation. If the sales order violates limits associated with the material at decisional step 1270, then, at step 1272, monitoring engine 224 transmits a notification of the violation to vendor 114. If the sales order does not violate limits associated with the material at decisional step 1270, then, at step 1274, monitoring engine 224 releases the sales order and transmits, at step 1276, the sales order to buyer 116. After transmitting the sales order, vendor 114 prepares the products for shipping to the buyer 116 at step 1278. Prior to shipping, if monitoring engine 224 does not confirm the amount of the material being shipped, then, at step 1282, monitoring engine 224 transmits an error to vendor 114. If monitoring engine 224 confirms the amount of the material being shipped, then, at step 1284, vendor 114 ships the material to buyer 116. Vendor 114 generates and transmits an invoice to buyer 116.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method, comprising:
identifying, at a computing device, a first document for a business process of an enterprise, wherein the first document identifies a volume of a material including a plurality of chemical substances for a requested purchase for a specified location prior to an actual purchase of the material;
identifying a specification for the material defining a volume for each of the plurality of chemical substances for a specified amount of the material;

prior to an actual purchase of the material, automatically determining a first volume of a chemical substance included in the plurality of chemical substances based, at least in part, on the material volume for the requested purchase and the specification;

identifying, at a computing device, a second document for the business process of the enterprise including the chemical substance;

determining a second volume of the chemical substance consumed within the specified location based, at least in part, on the second business document;

updating a volume for the chemical substance at the specified location with the first volume of the chemical substance requested to be purchased and the second volume of the chemical substance consumed within the specified location; and determining whether the updated volume of the chemical substance violates one or more safety protocols based, at least in part, on the updated volume prior to the actual purchase of the material.

2. The method of claim 1, the chemical substance currently possessed by the enterprise.

3. The method of claim 1, the chemical substance being acquired by the enterprise.

4. The method of claim 1, further comprising:
identifying an amount of a material based, at least in part, on the first document, the material including the substance;
identifying a specification associated with the material; and
determining the first volume of the substance based, at least in part, on the material amount and the material specification.

5. The method of claim 4, the material comprising a plurality of substances including the substance, the method further comprises:
determining a volume for each of the plurality of substances based, at least in part, on the material amount and the specification; and
updating a plurality of files based, at least in part, on the determined volumes, each file associated with at least one of the plurality of substances.

6. The method of claim 1, the business process comprising one of production, sales, or purchases.

7. The method of claim 1, wherein aggregating the first volume and the second volume comprises adjusting the first volume using the second volume.

8. The method of claim 1, further comprising:
identifying a first material including the substance, the first volume based, at least in part, on an amount of the first material; and
identifying a second material including the substance, the second volume based, at least in part, on an amount of the second material, the first material different from the second material.

9. The method of claim 1, further comprising:
identifying a list of substances associated with the enterprise, the list of substances identifying a plurality of substances including the substance;
identifying a plurality of documents based, at least in part, on the list of substances;
determining a plurality volumes of the substances based, at least in part, on the plurality of documents; and
updating a plurality of files with the determined volumes, the plurality of files associated with the substances identified in the list of substances.

10. An article comprising a non-transitory machine-readable medium storing instructions for causing data processing apparatus to perform operations comprising:
identifying, at a computing device, a first document for a business process of an enterprise, wherein the first document identifies a volume of a material including a plurality of chemical substances for a requested purchase for a specified location prior to an actual purchase of the material;
identifying a specification for the material defining a volume for each of the plurality of chemical substances for a specified amount of the material;
prior to an actual purchase of the material, automatically determining a first volume of a chemical substance included in the plurality of chemical substances based, at least in part, on the material volume for the requested purchase and the specification;
identifying, at a computing device, a second document for the business process of the enterprise including the chemical substance;
determining a second volume of the chemical substance consumed within the specified location based, at least in part, on the second business document;
updating a volume for the chemical substance at the specified location with the first volume of the chemical substance requested to be purchased and the second volume of the chemical substance consumed within the specified location; and
determining whether the updated volume of the chemical substance violates one or more safety protocols based, at least in part, on the updated volume prior to an actual purchase of the material.

11. The article of claim 10, the chemical substance currently possessed by the enterprise.

12. The article of claim 10, the chemical substance being acquired by the enterprise.

13. The article of claim 10, the instructions further perform operations comprising:
identifying an amount of a material based, at least in part, on the first document, the material including the substance;
identifying a specification associated with the material; and
determining the first volume of the substance based, at least in part, on the material amount and the material specification.

14. The article of claim 13, the chemical substance comprising a plurality of substances including the chemical substance, the instructions further perform operations comprising:
determining a volume for each of the plurality of substances based, at least in part, on the material amount and the specification; and
updating a plurality of files based, at least in part, on the determined volumes, each file associated with at least one of the plurality of substances.

15. The article of claim 10, the business process comprising one of production, sales, or purchases.

16. The article of claim 10, wherein the instructions perform operations comprising aggregating the first volume and the second volume comprises the instructions perform operations comprising adjusting the first volume using the second volume.

17. The article of claim 10, the instructions further perform operations comprising:

identifying a first material including the substance, the first volume based, at least in part, on an amount of the first material; and identifying a second material including the substance, the second volume based, at least in part, on an amount of the second material, the first material different from the second material.

18. The article of claim 10, the instructions further perform operations comprising:

identifying a list of substances associated with the enterprise, the list of substances identifying a plurality of substances including the substance;

identifying a plurality of documents based, at least in part, on the list of substances;

determining a plurality volumes of the substances based, at least in part, on the plurality of documents; and updating a plurality of files with the determined volumes, the plurality of files associated with the substances identified in the list of substances.

* * * * *